United States Patent
Watson et al.

(10) Patent No.: US 7,739,658 B2
(45) Date of Patent: Jun. 15, 2010

(54) WEB SERVER FOR REMOTE USER DEVICES SERVICE AND WEB PAGE GENERATION

(75) Inventors: Mark Alexander Watson, Farnbam (GB); Jonathan Rhys Tyack Lewis, Winchester (GB)

(73) Assignee: Volantis Systems Limited, Guildford Surrey (GB)

( * ) Notice: Subject to any disclaimer, the term of this patent is extended or adjusted under 35 U.S.C. 154(b) by 873 days.

(21) Appl. No.: 10/381,802

(22) PCT Filed: Sep. 24, 2001

(86) PCT No.: PCT/GB01/04235

§ 371 (c)(1), (2), (4) Date: Sep. 22, 2003

(87) PCT Pub. No.: WO02/27543

PCT Pub. Date: Apr. 4, 2002

(65) Prior Publication Data

US 2004/0049574 A1 Mar. 11, 2004

(30) Foreign Application Priority Data

Sep. 26, 2000 (GB) ................................ 0023570.5

(51) Int. Cl.
G06F 9/44 (2006.01)
G06F 15/16 (2006.01)
G06F 3/00 (2006.01)

(52) U.S. Cl. ................... 717/108; 709/217; 709/218; 709/219; 715/733

(58) Field of Classification Search ................. 717/108; 709/217, 218, 219; 715/733
See application file for complete search history.

(56) References Cited

U.S. PATENT DOCUMENTS 5,701,451 A 12/1997 Rogers et al.

(Continued)

FOREIGN PATENT DOCUMENTS

EP 0 994 426 A2 4/2000

(Continued)

OTHER PUBLICATIONS

Hori et al., "Annotation of Web Content for Transcoding", W3C Note Jul. 10, 1999, http://www.w3.org/TR/annot/.*

(Continued)

Primary Examiner—Wei Y Zhen
Assistant Examiner—Chih-Ching Chow
(74) Attorney, Agent, or Firm—Blakely, Sokoloff, Taylor & Zafman LLP.

(57) ABSTRACT

A web server (1) responds to a request message from a remote user device (2) by dynamically generating web page code capable of being interpreted by the user device. A device type identifier (45) is extracted from the request message and is input to a code generating engine (21) which interprets stored instructions for generating the web page code with reference to selected device dependent information corresponding to the device type identifier. The web page information is stored as a content document comprising a set of instructions written in a script language. The web server generates web pages in an appropriate form for each user device without the need to convert web pages from one form to another.

96 Claims, 27 Drawing Sheets

U.S. PATENT DOCUMENTS

| | | | | |
|---|---|---|---|---|
| 5,761,673 | A | | 6/1998 | McAllise et al. |
| 5,956,487 | A | * | 9/1999 | Venkatraman et al. ...... 709/218 |
| 5,963,952 | A | * | 10/1999 | Smith .................. 707/102 |
| 6,035,332 | A | * | 3/2000 | Ingrassia et al. ........ 709/224 |
| 6,049,831 | A | | 4/2000 | Gardell et al. |
| 6,101,509 | A | * | 8/2000 | Hanson et al. ........... 715/513 |
| 6,133,912 | A | * | 10/2000 | Montero ................. 715/716 |
| 6,229,534 | B1 | * | 5/2001 | Gerra et al. ............. 715/733 |
| 6,300,947 | B1 | * | 10/2001 | Kanevsky ................ 715/866 |
| 6,311,180 | B1 | * | 10/2001 | Fogarty .................... 707/4 |
| 6,311,197 | B2 | * | 10/2001 | Mighdoll et al. ........... 715/513 |
| 6,353,850 | B1 | * | 3/2002 | Wies et al. ............... 709/203 |
| 6,401,125 | B1 | * | 6/2002 | Makarios et al. ............ 709/229 |
| 6,453,340 | B1 | * | 9/2002 | Emura ................... 709/206 |
| 6,477,576 | B2 | * | 11/2002 | Angwin et al. ............ 709/226 |
| 6,556,217 | B1 | * | 4/2003 | Makipaa et al. ............ 345/667 |
| 6,636,863 | B1 | * | 10/2003 | Friesen .................. 707/102 |
| 6,845,396 | B1 | * | 1/2005 | Kanojia et al. ............. 709/224 |
| 7,032,030 | B1 | * | 4/2006 | Codignotto ............... 709/246 |
| 2001/0009016 | A1 | * | 7/2001 | Hofmann et al. ............ 709/219 |
| 2001/0013054 | A1 | * | 8/2001 | Okawa et al. .............. 709/204 |
| 2001/0054049 | A1 | * | 12/2001 | Maeda et al. .............. 707/517 |
| 2002/0038349 | A1 | * | 3/2002 | Perla et al. ................. 709/217 |
| 2002/0112237 | A1 | * | 8/2002 | Kelts ...................... 725/39 |

FOREIGN PATENT DOCUMENTS

| | | |
|---|---|---|
| GB | 2 339 374 A | 1/2000 |
| GB | 2 346 238 A | 8/2000 |
| GB | 2 347 329 A | 8/2000 |
| JP | 11250009 | 9/1999 |
| WO | WO 97/44946 A1 | 11/1997 |
| WO | WO 99/57657 A1 | 11/1999 |

OTHER PUBLICATIONS

Han et al., "Websplitter, multi-device collaborative web browsing using Bluetooth", http://web.archive.org/web/20000818004254/http://www.research.ibm.com/compsci/mobile/websplitter.html; also see IBM Research Report RC21744.*

Didier Martin, "Write Once, Publish Everywhere (II)", Aug. 16, 2000, pp. 1-5, http://www.xml.com/pub/a/2000/08/16/didier/part2.html.*

Bickmore, Timothy W., et al. "Digestor: device-independent access to the World Wide Web," *Computer Networks and ISDN Systems*, North Holland Publishing. Amsterdam, The Netherlands, vol. 29, No. 8-13, Sep. 1, 1997, pp. 1075-1082, XP004095305, ISSN: 0169-7552.

Fox, Armando, et al. "Reducing WWW latency and bandwidth requirements by real-time distillation," *Computer Networks and ISDN Systems*, North Holland Publishing. Amsterdam, The Netherlands, vol. 28, No. 11, May 1, 1996, pp. 1445-1456, XP004018241, ISSN: 0169-7552.

Neumann, L., et al. "Resource adaptive WWW access for mobile applications," *Computers & Graphics*, vol. 23, No. 6, pp. 841-848, Dec. 1999.

Pappo, Nicky. "Middleware Bridges Internet, Wireless," *Telecommunications*, 34, 5, 47, May 2000.

Shimada, Takao, et al. "Interactive scaling control mechanism for World-Wide Web systems," *Computer Networks and ISDN Systems*, North Holland Publishing. Amsterdam, The Netherlands, vol. 29, No. 8-13, Sep. 1, 1997, pp. 1467-1477, XP004095341, ISSN: 0169-7552.

* cited by examiner

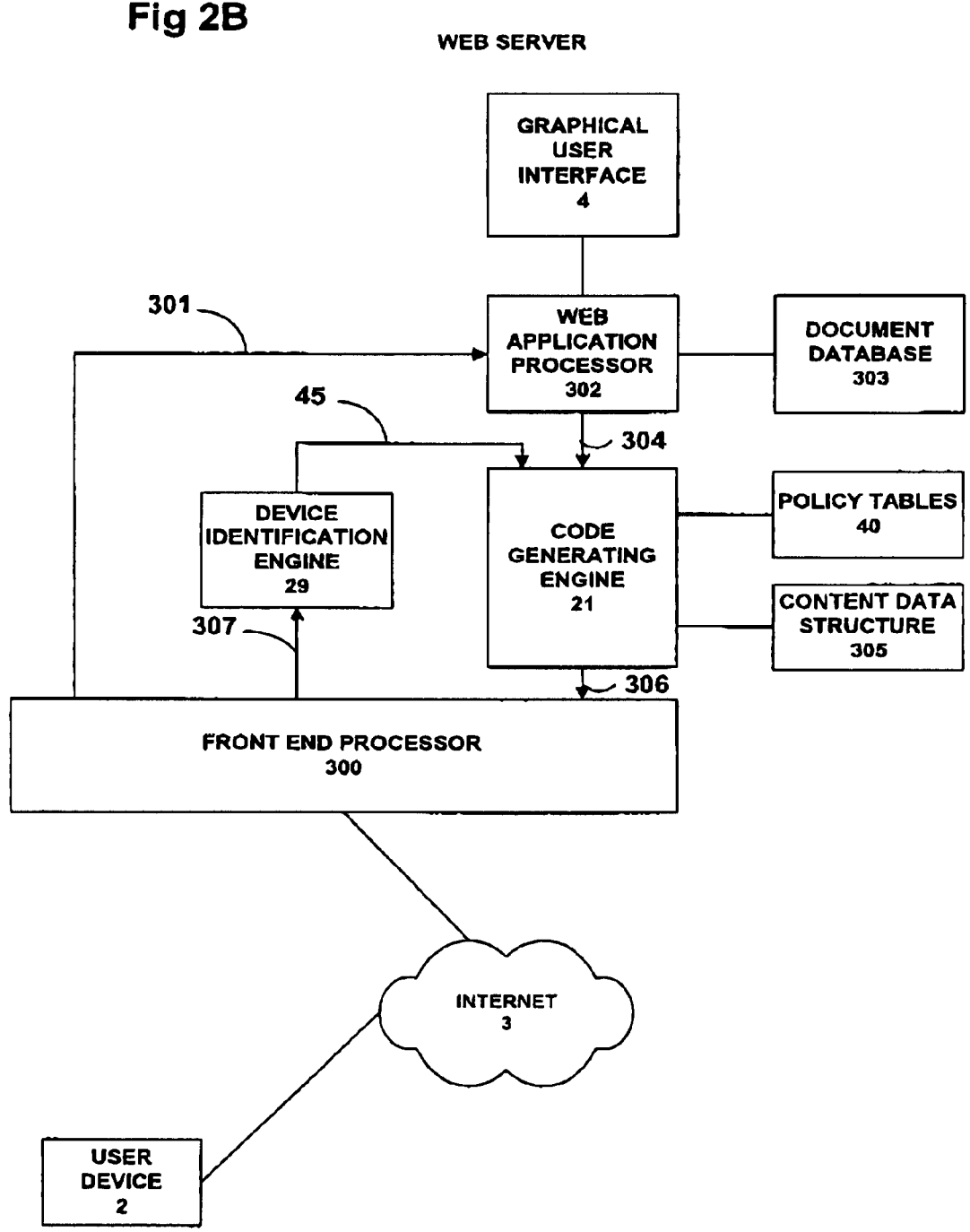

Fig 3     POLICY TABLES
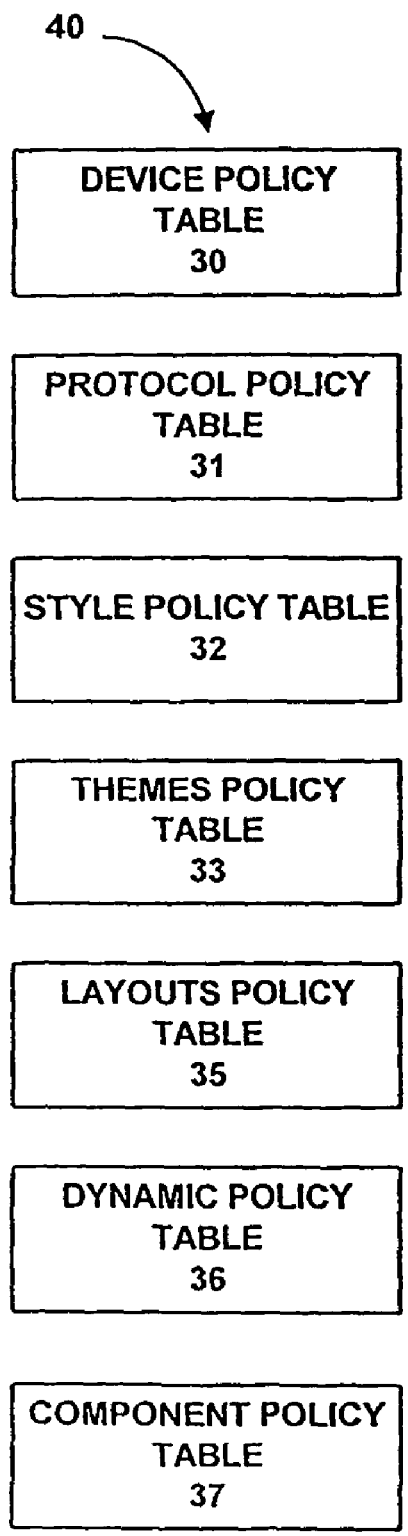

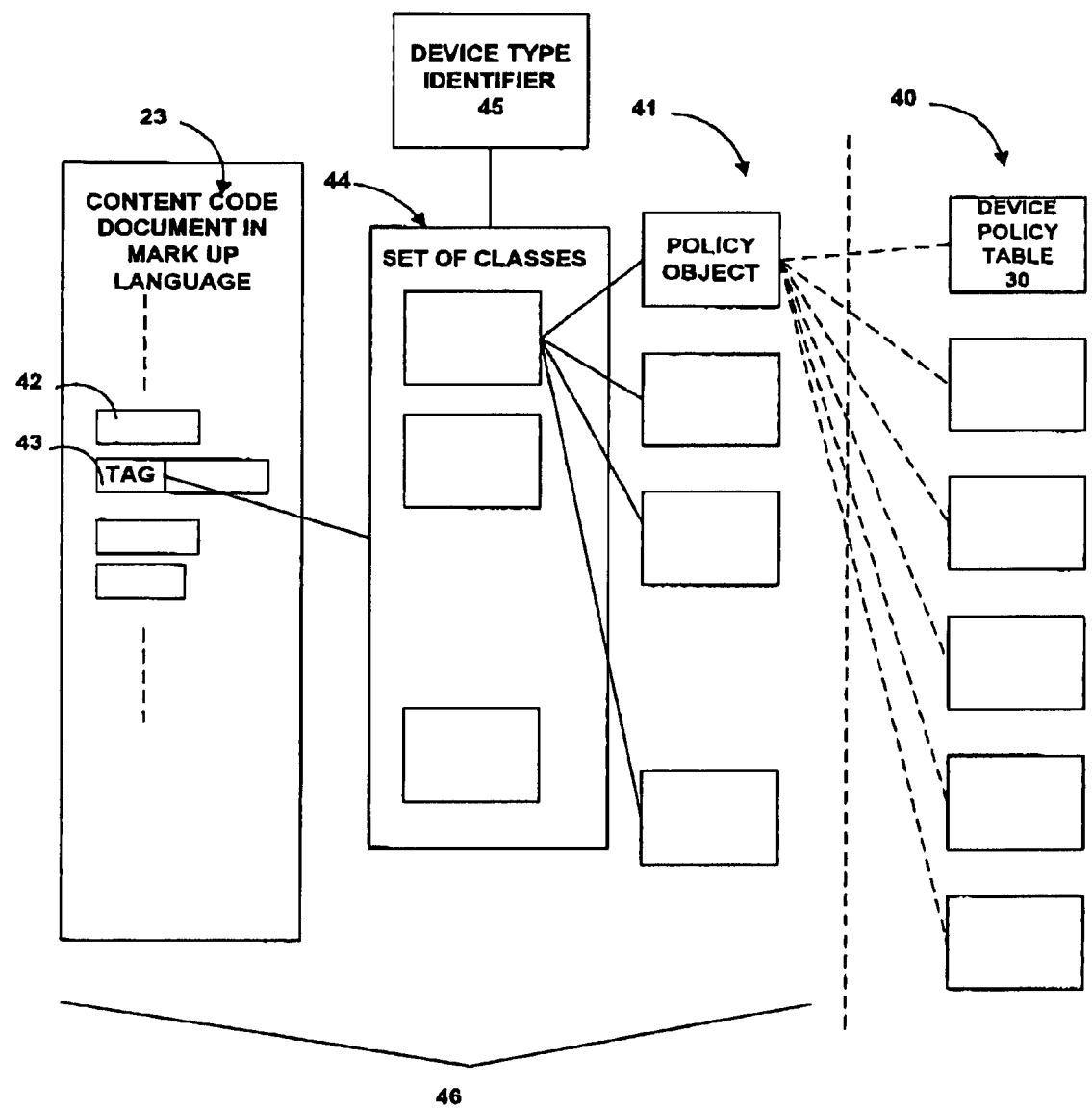

PC LAYOUT

TV LAYOUT

PDA LAYOUT

WAP PHONE LAYOUT 55
56

HEIRARCHY OF DEVICE POLICY TABLE

DATA SELECTION USING A
COMPONENT LOGIC SOFTWARE
MODULE

Fig 16 — ACCESSING DATA DURING CODE GENERATION

Fig 17    HEIRARCHY OF DATA OBJECTS WHICH ARE DIFFERENT VERSIONS OF DATA REFERENCED BY A SINGLE COMPONENT NAME

DISSECTING PANES

Fig 22     SESSION MEMORY

WEB SERVER FOR REMOTE USER DEVICES SERVICE AND WEB PAGE GENERATION

This Application is a National Phase of International Application No. PCT/GB01/04235 filed on Sep. 24, 2001, which claims priority from United Kingdom Patent Application No. 0023570.5, filed on Sep. 26, 2000, This invention relates to web servers and in particular but not exclusively to a web server for responding to request messages received via the internet from remote user devices and to a web server capable of responding with web page code tailored to meet the capabilities of the remote user device.

The use of the internet has recently flourished to the extent where almost every business concern has its own website to provide information and online purchasing facilities. The majority of such websites have in the past been accessed by remote user devices which are PCs (Personal Computers) using one of a relatively small number of available browser applications so that, by and large, the websites were required to output web page code in a single format for viewing at the user device.

More recently, there has been a proliferation in new internet enabled devices such as PDAs (Personal Digital Assistants), mobile telephones with WAP (Wireless Application Protocol) facilities, IDTV (Interactive Digital Television), information kiosks, games, consoles and home appliances. The capabilities of these devices vary considerably from device to device, both in their display function in terms of screen size and colour processing ability, bandwidth and available memory as well as variables associated with communication including image format, communication protocol and markup language.

In order to enable users of these different devices to access their websites, many businesses have resorted to building separate web servers to serve each device type. This however creates data management problems where a customer may wish to have the option of using different devices to communicate with the merchant using the same account details for example, the merchant then requiring a proliferation of different web server applications to be managed and updated when required with new or additional material.

An alternative approach has been to provide a separate port of a website for access by an alternative type of user device, the separate port obtaining the required web page code by translating the original PC based web page code, typically in HyperText Markup Language (HTML) format, to other device formats such as Wireless Markup Language (WML) used for WAP telephones. Such solutions however generally have failed to deliver optimum presentation to the user of the device. The translating process (often referred to as "transcoding") is difficult to engineer. For example, it is necessary to provide appropriate selection of information which is to be omitted from display in the device having lower capabilities than the PC. This difficulty is compounded when it is necessary to update the original PC web page code because the transcoding process must also be reengineered.

It has also been proposed that the protocols used for accessing web page information over the internet should be unified by the adoption of standards in order to overcome problems resulting from remote user devices having different capabilities. The use of Extensible Markup Language (XML) as a format for web page code has been proposed. XML is a mark-up language for defining content and can be used with XSL (Extensible Stylesheets Language) used to transform XML documents with style sheets at the point of presentation. As yet however, such standards have not been adopted and this solution is not seen as optimum for all device types.

The present invention seeks to provide an improved web server with multi-channel capabilities able to serve different types of remote user device.

According to the present invention there is disclosed an apparatus for responding to a request message from a remote user device for web page information by generating web page code representative of one or more web pages to be displayed by the user device and outputting a response message comprising the web page code.

Preferably the apparatus comprises extracting means for extracting from the request message a device type identifier identifying the remote user device as being one of a set of possible device types having different capabilities.

The apparatus preferably has a processor for operating a code generating engine to generate the web page code, first memory means for storing the web page information as a set of instructions, and second memory means for storing device dependent information for each of the different device types for tailoring the web page code to the capabilities of the device type.

The code generating engine preferably comprises interpreting means for interpreting the instructions with reference to selected device dependent information corresponding to the device type identifier, the code generating means thereby being operable to generate the web page code in a form in which the web page code is tailored to the capabilities of the remote user device.

Preferred embodiments of the present invention will now be described by way of example only and with reference to the accompanying drawings of which:

FIG. 2B is a functional diagram for illustrating signal flow in the web server of FIG. 2A;

FIG. 3 is a schematic diagram of policy tables for use with the web server of FIG. 2;

FIG. 4 is a schematic diagram illustrating operation of the code generating engine;

Figure 1:
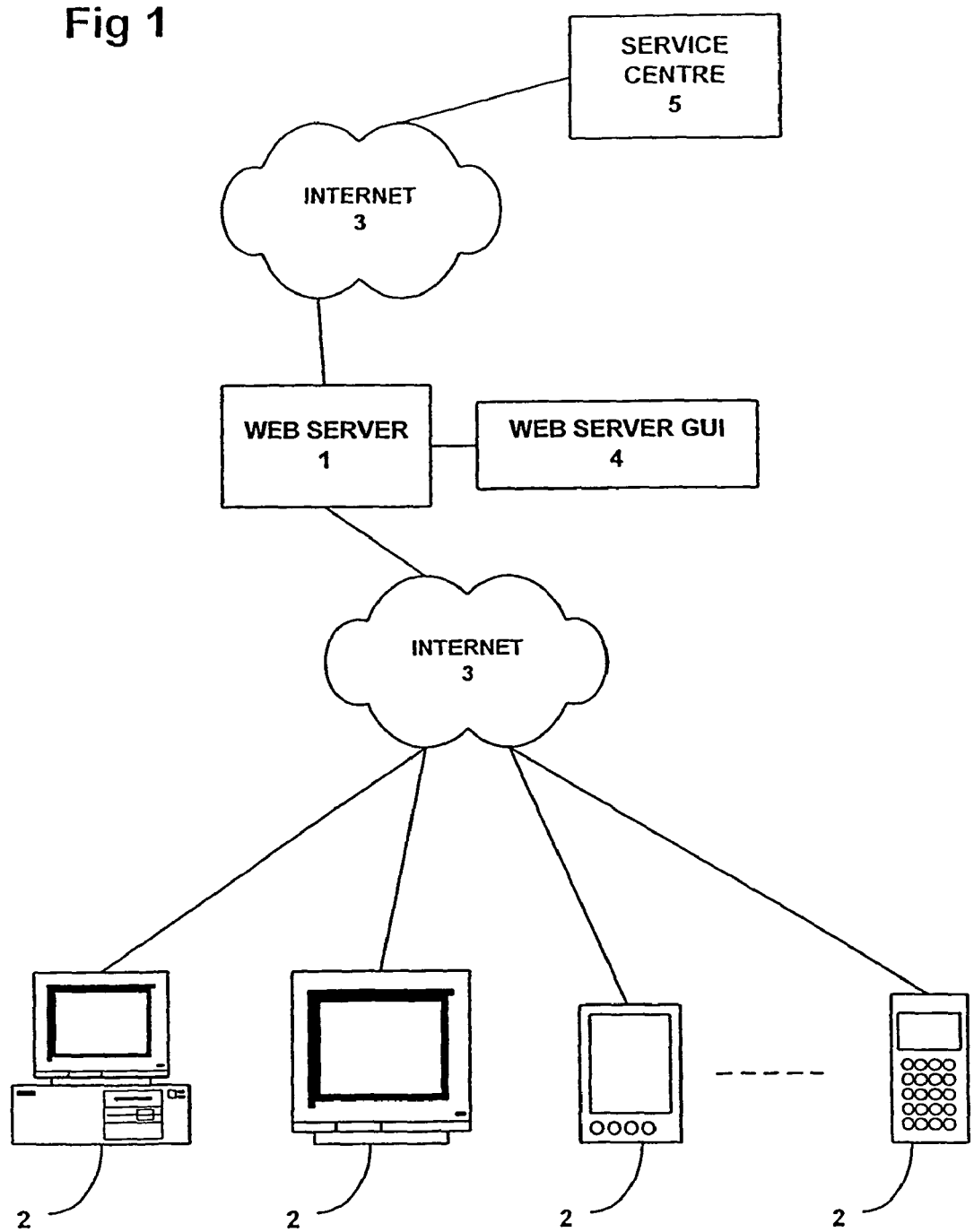
FIG. 1 is a schematic overview of connection between a web server and remote user devices.

FIG. 1 illustrates a web server 1 connected to remote user devices 2 via the internet 3. The remote user devices are illustrated to be a PC, television, PDA, and a mobile telephone with WAP facility but can include any number of different devices with internet capability. The web server 1 is provided with a web server GUI (Graphical User Interface) 4 enabling an operator of the web server to author documents and generally control and maintain operation of the web server. The web server 1 is also connected via the internet 3 to a service centre 5 which acquires information concerning any new types of user device and provides the web server 1 with consequential software revision when required.

Figure 2A:
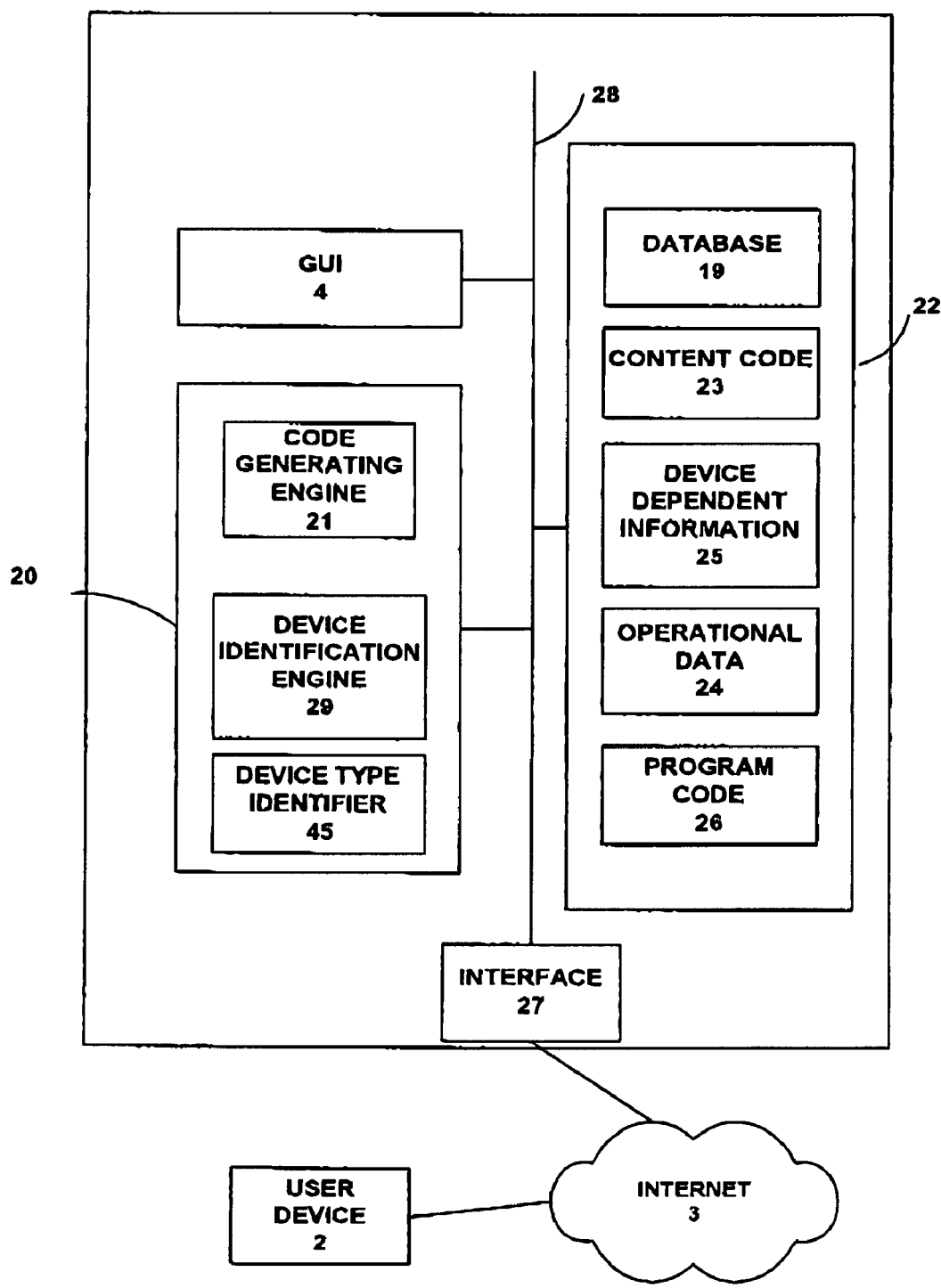
FIG. 2A is a schematic diagram of the web server of FIG. 1.

FIG. 2A is a simplified schematic diagram of the web server 1 of FIG. 1. The web server 1 includes a processor 20 which operates a code generating engine 21 in the form of an application which is run by the processor on demand in order to generate web page code. The code generating engine 21 in this embodiment is written in the JAVA programming language and during operation of the web server exists in the working memory of the processor 20 in compiled form as byte codes and is implementable within a JAVA run time environment.

A memory 22 stores content code 23 which defines web page information in the form of documents written in a mark up language which in the present example is JSP1.1 (JAVA Server Pages). These documents are typically authored by the operator of the web server 1 using the graphical user interface 4. The memory 22 also stores operational data 24 which includes for example data which may need to be incorporated into web page code generated at run time in response to specific queries originating from the user device 2 and data acquired b monitoring usage of the web server. Data objects referenced by the content code 23 are stored in a database 19. These data objects may include files containing images or text and other forms of data objects which an author may wish to include in the web page code to be generated.

Device dependent information 25 is also stored in memory 22 and consists primarily of policy tables described below. The memory 22 also stores program code 26 which may be accessed by the processor 20 during operation of the server 1 or used to retrieve software such as the code generating engine 21 at the time of startup. The program code 26 also includes code defining a set of tags used in a mark up language in which the documents are authored as described below.

An interface 27 communicates between a databus 28 serving the processor 20 and memory 22 and external connection to the internet 3 for receiving request messages and transmitting response messages.

A device identification engine 29 is provided for extracting from received messages a device type identifier for identifying the remote user device 2 by type. The device identification engine 29 in the present example is implemented in software by the processor 20. In this example, a request message received via the internet contains a HyperText Transfer Protocol (HTTP) header which includes an ID string declaring the name of the user agent which the originating device has used when generating the request message. The name of the user agent software defines for example the browser version and markup language capability of the device and is used by the device identification engine 29 to identify the originating device using the device type identifier which may for example be stored as a lookup table.

The HTTP header may also yield information contained in a cookie regarding details of the user who has originated the request message. Such cookies may contain other data used for personalisation of the response made by the web server 1.

FIG. 2B is a further illustration of the web server 1 showing functional elements in a manner which illustrates the signal flow. A front end processor 300 provides a communications interface for request messages received from the internet 3 and response messages transmitted to the user device 2 via the internet. The front end processor 300 sends URL information 301 to a web application processor 302 which determines from the URL the appropriate information to be included in a web page requested by the user. The web application processor 302 has access to a database 303 which may be local to the processor or may be at a remote location which is accessible via an appropriate communications link.

The web application processor 302 outputs a document 304 comprising instructions for generating web page code. The document 304 is not itself capable of being interpreted by a browser of a user device and therefore does not constitute "web page code" for the purpose of the present description.

The document 304 is input to the code generating engine 21 which generates web page code with reference to content data structure 305 and the set of policy tables 40. The output of the code generating engine is a web page code document 306 which is now in a form which is capable of being interpreted by the browser of the user device 2. The web page code document 306 is received by the front end processor 300 and packaged as a response message transmitted via the internet 3 through the user device 2.

To enable the code generating engine 21 to select the appropriate data from the content data structure 305 and to access the appropriate policy tables 40, it also requires the input of a device type identifier 45 which is provided by device identification engine 29 in response to receiving a message header signal 307 from the front end processor 300, this signal comprising information extracted from the message header of the request message received from the user device.

FIG. 3 illustrates schematically the policy tables 40 which constitute the device dependent information 25 of FIG. 2A.

In the present context, the term "policy" is used to signify information to be utilised by the code generating engine 21 and which can be defined differently for different device types, either out of necessity because of different technical capabilities of different device types or as a result of choice exercised by the author of the content code 23.

The policy tables 40 include a device policy table 30 which contains a number of fields relating to different technical aspects of the device type. By way of example, table 1 below lists a small number of device policies that can be associated with the device type and which each correspond to one field (i.e. row) of the table. Values are illustrated for a single device type (i.e. a single column). The device policy table 30 in practice will include a large number of different fields and values for multiple device types using a hierarchical table structure to represent the table in compact form.

TABLE 1

Part of Device Policy Table

| POLICY | VALUES |
| --- | --- |
| Supports GIF format images | true/false |
| Supports JPEG format images | true/false |
| Supports MP3 format audio | true/false |
| Supports WAV format audio | true/false |
| Can report global position (GPS) | true/false |

By accessing the device policy table 30, the code generating engine 21 thereby is able to exercise decision making regarding choice of code generation to suit the technical capabilities of the user device 2. For example, if an image is to be included as an image file in the web page code, it is necessary for the code generating engine 21 to have knowledge of the form of image data compression available to the user device 2 from which the request message originated. The device policy table 30 includes fields indicating whether GIF or JPEG format images can be decompressed by the device. Similarly, audio files may be compressed in a number of different forms including MP3 format and the device policy table 30 also includes a field indicating whether the device supports MP3.

The protocol policy table 31 is responsible for mapping equivalences between device output protocols, which are generally termed markup languages. Examples are WML, HTML, Handheld Device Markup Language (HDML) and compact HTML (cHTML). Table 2 is an example of six of the fields in the protocol policy table 31 for a single one of the device types.

TABLE 2

Part of Protocol Policy Table

| PROTOCOL | ELEMENT |
| --- | --- |
| HTML Version 4.0 | <thead> |
| HTML Version 3.2 | <thead> |
| HTML i-Mode | no equivalent |
| XHTML Basic | <thead> |
| WML Version 1.1 | <thead> |
| HDML Version 3 | no equivalent |

A style policy table 32 contains a number of fields which define-parameters such as font family, font size, font weight and colour of headings, image borders and paragraph background as illustrated in Table 3 which shows part of the style policy table for a single one of the device types. The code generating engine 21 is thereby able to generate code appropriate to the device type, in accordance with a predetermined decision which may for example reflect an agreed style adopted as a general trading style by a particular business entity.

The way in which stylistic information is handled varies between different devices, and indeed between different device output protocols. For some, style information must be included within the generated web page code. For others, style information must be provided in separately generated code, often called a "style sheet".

TABLE 3

Part of Style Policy Table

| POLICY | VALUES |
| --- | --- |
| Heading 1 font family | name of a font family, e.g. Times |
| Heading 1 font size | font size, e.g. 20 |
| Heading 1 font weight | font weight, e.g. bold |
| Heading 1 colour | colour |
| Image border colour | colour for the border of images |
| Paragraph background colour | colour for the background of paragraphs |

A themes policy table 33 similarly contains fields relating to decorative embellishments and logos adopted by business entities for their web pages and enables the author of the themes policy to tailor the decorative features and aspects of logo such as size for each of the device types.

A layouts policy table 35 contains fields relating to the layout of elements comprising text, logos, images etc at the point of rendering the image in the user device in order to take account for example of different screen shape and size for different device types.

A dynamic policy table 36 contains fields-allowing code for different device types to be tailored according to time varying parameters. As an example, a mobile telephone having WAP facilities may have a bandwidth for receiving response messages which varies with time according of the strength of signal available via the cellular mobile telephone network used by the telephone to connect to the internet. The dynamic policy may be configured to generate code requiring low bandwidth under low bandwidth conditions and higher bandwidth under better conditions. The amount of image data for example may be regulated in order to control the bandwidth required to carry the response message. Simply by omitting a logo or other image, the speed with which the response message can be downloaded to the device can be maintained under poor signal strength conditions.

A component policy table 37 is also provided the purpose of which is to determine selection of data objects as described below.

FIG. 4 illustrates schematically the manner in which the code generating engine 21 makes use of the data in the policy tables 40. At startup, the processor 20 retrieves a startup program from the stored program code 26 and runs the startup program to assimilate the information in the policy tables 40 into a series of Java objects (Java beans) referred to herein as policy objects 41 which are then made available within a run time environment 46 of the code generating engine 21. The run time environment is provided by an appropriate Java Virtual Machine. The policy objects 41 each deal with specific aspects of code generation and contain logic and data objects configured such that each policy object has knowledge of all of the relevant information available from the policy tables 40 for each device type. One policy object 41 for example may be concerned with image format capability whereas another policy object may be concerned with choice of markup language for the output code. The code generating engine 21 at run time processes a compiled version of a document of the content code 23, the code consisting of a series of instructions 42, each instruction including one of a set of markup tags 43.

In FIG. 4, tag 43 is illustrated as being one of a number of custom or smart tags which, as represented schematically in FIG. 4, refers when processed to a set of classes 44 which have been written to carry out the required function of the tags. These classes 44 in turn refer to one or more of the policy objects 41 whenever a program decision is to be taken which is dependent upon the device type on the basis of data contained in the policy tables 40.

Examples of custom tags 43 provided in accordance with the present embodiment are summarised in tables 4 and 5. All of the tags utilised in defining the content code 23 are device aware in the sense that they are implemented as JSP custom tags and are associated with Java classes which access Java beans (policy objects 41) to make device dependent decisions. The more primitive tags are referred to here as simple in-line tags as shown in Table 4. More complex tags are referred to as major block tags in Table 5. The major tags typically translate into more than one tag in the markup language of the resulting generated code, for example HTML.

TABLE 4

| Simple In-Line Tags | |
|---|---|
| cite | Causes text to be displayed as a citation |
| code | Formats text suitable for illustrating code samples |
| em | Causes text to be displayed emphasized |
| hr | Displays a horizontal rule |

TABLE 5

| Major Block Tags | |
|---|---|
| anchor | Link to another canvas, page or section |
| canvas | Define the layout and theme to be applied to this canvas |
| h1 to h6 | Define headings at 6 different levels |
| form | Define an input form |
| textinput (part of form) | Define a text input field for a form |
| select (part of form) | Define a selection field for a form |
| option (part of form) | Define an option within a selection field for a form |
| image | Define an image |
| logo | Define a logo |
| menu | Define a menu |
| menuitem (part of menu) | Define one item within a menu |
| shopcart | A basic shopping cart |
| table | Define a table |

The device identification engine 29 operated by processor 20 extracts from a header of the received request message from a remote user device 2 information which identifies the device type and outputs a device type identifier 45 which is input to the code generating engine 21 to enable the set of classes 44 to extract the required information from the policy objects 41.

An example of a document is given at Appendix 1 and comprises a set of instructions 42 including tags 43 to constitute the content code 23 in the markup language operated upon by the code generating engine 21. At line 2 for example, the tag <vt:canvas> is used in defining the theme and layout for the web page to be created. Between the opening and closing canvas tags (occurring at the second line and last line) is a list of components which are also implemented using custom tags 43. The components reference panes in the layout, the term "pane" being used to signify one of a series of (generally) rectangular regions into which a display screen is to be divided when the web page is presented to the user on the user device 2. A collection of panes and their relative positions defines the layout for the page. The components can be used to define where in the rendered page a given component's output will appear, or alternatively to determine whether or not a given component is to be rendered when the web page is displayed for example on a user device having limited screen size. In this way, layouts can be used to limit the amount of information which appears on the display screen of certain device types.

Figure 5A:
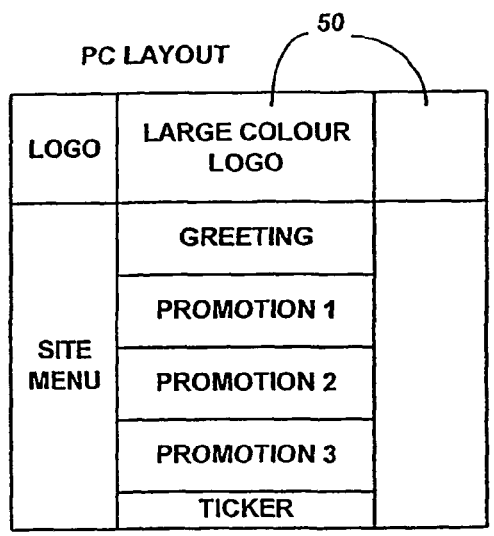
FIG. 5A illustrates a layout for a PC.

FIG. 5A for example illustrates a typical layout of panes 50 for display on a PC and including panes which respectively include a logo, a large colour logo, a site menu, a greeting, first, second and third promotions, and a news ticker providing continuous news information.

Figure 5B:
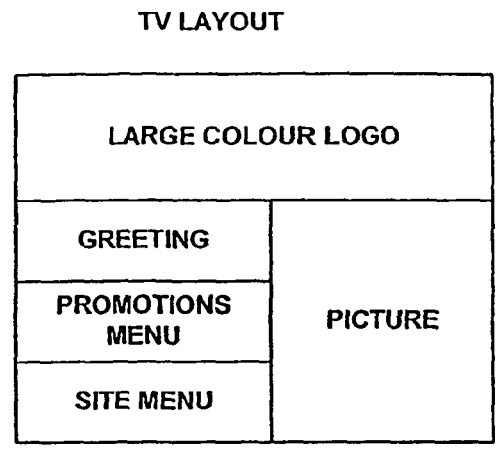
FIG. 5B illustrates a layout for a television.

The layout corresponding to the same content document when generated for display on a television screen is shown in FIG. 5B and consists of a reduced number of panes containing respectively a large colour logo, a greeting, a promotions menu, a site menu and a picture.

Figure 5C:
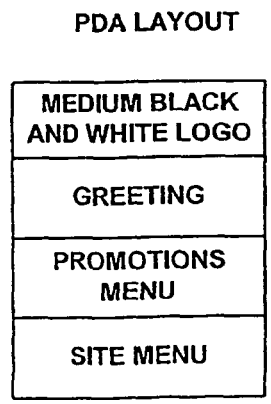
FIG. 5C illustrates a layout for a PDA.

FIG. 5C illustrates the corresponding rendered screen resulting from code generated based on the same content document when tailored for a PDA. The number of panes is considerably reduced during code generation to meet the limited capabilities of the PDA and includes panes which respectively contain a medium sized black and white logo, a greeting, a promotions menu and a site menu.

Figure 5D:
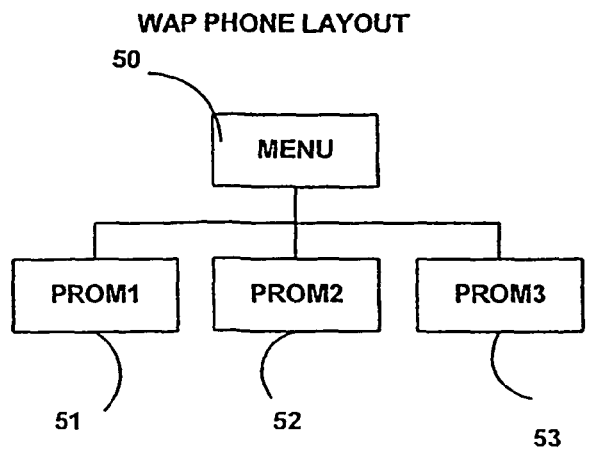
FIG. 5D illustrates a layout for a WAP telephone.

FIG. 5D illustrates the layout resulting from code generation based on the same document when tailored to a WAP telephone. Instead of a single web page, the content is reduced to a set of fragments, often called decks, each comprising a single pane accessible via a menu deck 50, the set of decks further including single pane decks 51, 52 and 53 for promotions 1, 2 and 3 respectively. "Deck" is a term used in the WAP standards to indicate the units in which information is transmitted to the wireless device.

Appendix 2 illustrates the web page code generated using the content code of Appendix 1 where the device type corresponds to a PC having a browser using the HTML protocol.

Appendix 3 illustrates the corresponding code generated when output to a device type corresponding to a telephone with WAP capabilities using WML protocol. Appendix 3 contains only one deck of a set of decks contained in the generated code, the user being required to select successive decks in order to view in turn a number of successive displays of the web page information. The fragmentation of the response message code into decks is illustrated in FIG. 5D for example.

Appendix 4 illustrates a further deck resulting from the WML code for the WAP telephone, this time the deck corresponding to the menu deck 50 of FIG. 5D in that it contains a list of stories which can be viewed in successive decks by the user.

Appendix 5 illustrates the deck created for one of the stories.

In the above example, the code generating engine 21 is capable of processing the same content code 23 to produce radically different web page code output corresponding to different device types. The first device type results in the code of Appendix 2 and the second device type which has lower capabilities results in the code of Appendices 3, 4 and 5.

Figure 5E:
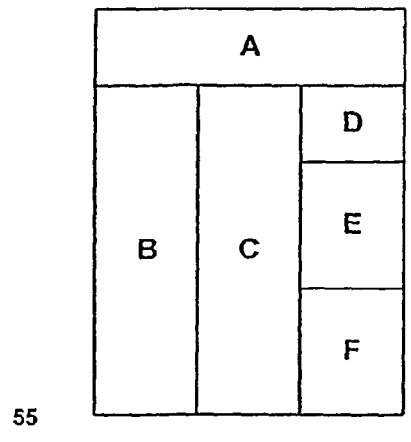
FIG. 5E illustrates layout for a device having a large screen.
Figure 5F:
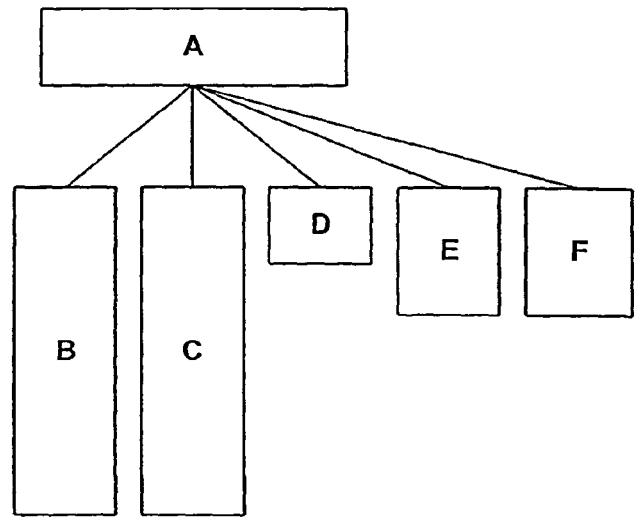
FIG. 5F illustrates the display of fragments in a device having a small screen.

FIGS. 5E and 5F illustrate the manner in which the provision of different layout definitions for two different remote user devices 2 enables the entire content of a web page to be delivered to devices with dissimilar capabilities.

In FIG. 5E, the layout for a device having a large screen has the effect of displaying the entire content in a single screen, portions of the content being contained in respective panes A, B, C, D, E and F. When formatted for the device with a small screen, only one of the panes A, B, C, D, E and F is displayed at any given time, the content thereby being fragmented into fragments A, B, C, D, E and F as illustrated in FIG. 5F. Fragment A is designated as a root fragment via which the remaining fragments may be accessed using a menu.

For the device with small screen capability, the fragment may need to be re-shaped or the content presented differently so that it may for example be necessary for the user to scroll through text to see the entire contents of a given fragment containing text.

Figure 5G:
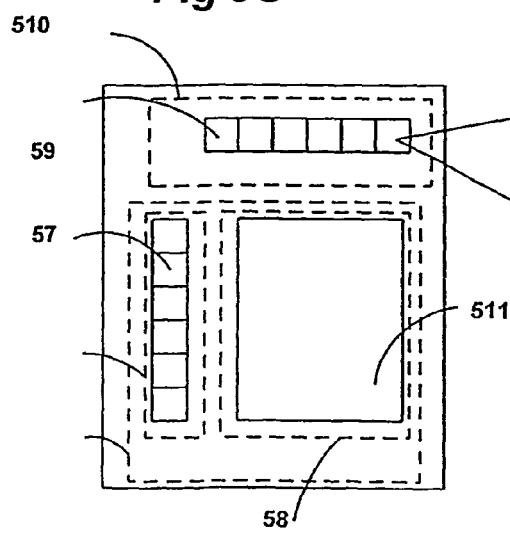
FIG. 5G illustrates a multi-menu structure in a large screen device.
Figure 5H:
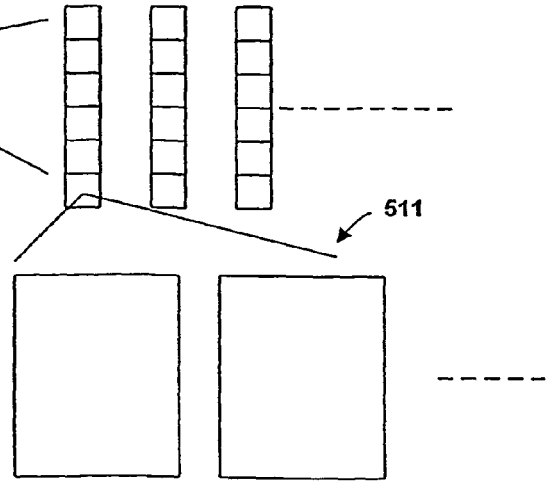
FIG. 5H illustrates the relationship between control segments and content segments in the layout of FIG. 5G.

A multi-menu structure may alternatively be utilised as illustrated in FIGS. 5G and 5H. Instead of defining the layout in terms of panes, the layout is defined in terms of a series of segments defining areas of the display and designated as either control segments or content segments. In FIG. 5G, a control segment 55 contains a menu bar 56 composes of a series of icons which can be user selected.

A content segment 57 defines a further area of the display and itself contains a further content segment 58. Content segment 57 also contains a further control segment 59 which contains a second menu bar 510.

In this example, selection using the first menu bar 56 calls for display within control segment 59 of a selected one of a set of second menu bars 510 as illustrated in FIG. 5H. Each of the second menu bars 510 allows selection from a respective set of content items 511.

The example of FIGS. 5G and 5H illustrates an alternative method of page description in which a montage tag defines page layout in terms of a series of segments which may be content segments or control segments. As shown in this example, it is possible for a content segment to contain further segments including both control and content segments.

FIG. 5G corresponds to the web page viewed on a large screen device. When translated to a small screen device, the user might for example see only one segment at any time, initially viewing the first control segment 55 to allow selection of one of the second menu bars 510, and subsequent selection of one of the content items 511.

The resulting layout of FIG. 5G can be implemented using the inline frames feature of HTML.

The above examples of FIGS. 5A to 5H take two extremes of display capabilities of user devices. For devices of intermediate capabilities, alternative layouts showing perhaps two or three segments or panes may be appropriate. It may also be appropriate to modify the content within each pane or segment according to the capabilities of the device. For example, a PC is generally capable of a higher standard of image presentation including colour and moving images whereas a WAP phone may not have colour facility and may have limited screen resolution and refresh rate. This requires that for each pane or segment the content must be stored in a number of different forms appropriate to different devices.

Figure 6:
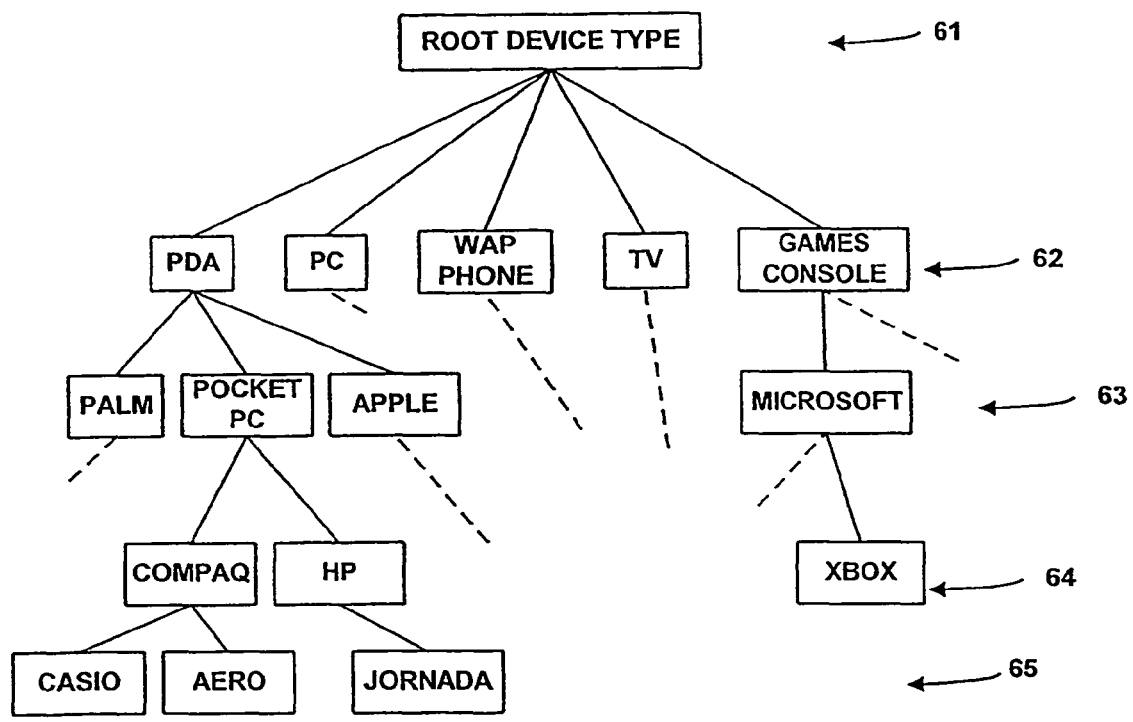
FIG. 6 illustrates the hierarchy of a device policy table.

The policy tables 40 are each arranged to have a hierarchical structure such as the structure illustrated for example in FIG. 6 which shows the hierarchy of the device policy table 30. Characteristics of a notional root device type define an upper level 61 of the hierarchy. This root type may be regarded as representing default values for the device policy table 30. A second layer 62 defines device types which differ from the root device type in a number of features. The device policy table will therefore include entries (columns) for those fields in which the parameters describing the root device type are not inherited. The third layer 63 of the hierarchy includes sub-divisions of the general device types of the first layer, for example a number of different PDA device types are illustrated. Each of these device types will inherit many of the parameters describing the capabilities of the PDA in the first layer but will differ in a number of respects, thereby requiring entries in respective columns of the device policy table for those fields which contain parameters not inherited.

Subsequent layers 64 and 65 of the hierarchy define further sub-divisions of device type.

The device identifier 45 will identify a node in this hierarchical tree and the complete set of attributes relevant to the device type may then be acquired by traversing the tree defined by the hierarchy structure from the node through successive layers to the root device type defined in the upper layer 61, acquiring further inherited attributes at each layer.

An advantage of organising each of the policy tables 40 in such a hierarchical structure is that, when it is required to expand the policy tables 40 to include data for an additional device type, this can be achieved by inserting a new node to the hierarchical tree structure and connecting the new node with a branch from a parent node in an adjacent upper layer. The parent node is selected to be the node from which the device type inherits the most complete set of attributes.

If for example a mobile telephone is already represented in the policy tables 40 and a new model of the mobile telephone becomes available, any change in the capabilities of the new model which require changes to policy can be represented by a minimal amount of data, corresponding to a new entry in each policy table containing values only in those fields for which attributes are not inherited from the existing model of mobile telephone represented by an existing node in the hierarchy.

Information for updating the policy tables 40 to include additional device types may be provided by the service centre 5 shown in FIG. 1 and transmitted to the web server 1 for example over the internet 3. The device dependent information 25 including the policy tables 40 may then be updated by operation of data manager 190, a software module of the web server 1 represented schematically in FIG. 2. Generally this procedure may be undertaken during normal operation of the web server 1 and operation of the code generating engine 21. In response to the policy tables 40 being updated, the policy objects 41 automatically update themselves while managing their current use in the operating environment 46 of the code generating engine 21. This activity is regulated so as not to disrupt any web page code currently being generated by the code generating engine 21.

Figure 7:
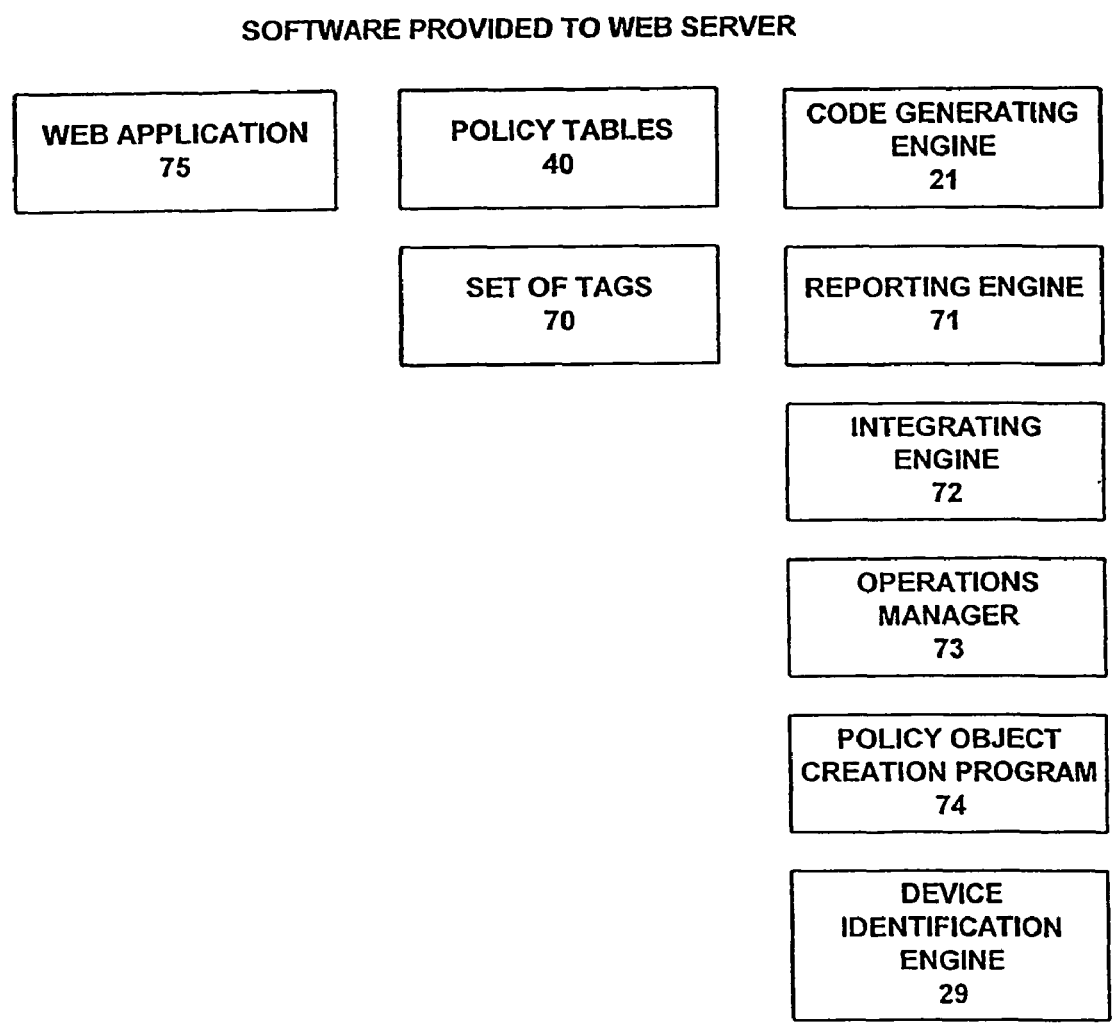
FIG. 7 illustrates schematically the software provided to the web server.

FIG. 7 illustrates an example of software provided to the web server in a preferred embodiment. The software includes the set of policy tables 40 and a set of tags 70, including both tag definitions which provide the necessary information to enable authoring of content and code for implementing the tags i.e. the program code which runs when each tag is used in the operating environment of the code generating engine 21.

The code generating engine 21 and device identification engine 29 are among the items provided to the web server. Also provided is a reporting engine, 71. The reporting engine is operated by the processor 20 to perform tasks such as measuring usage of the web site. This information may be used to demonstrate, for example, for the purpose of advertising, the extent to which the is used and also to enable personalised marketing to be targeted to users of the site. As an example, a database of users may be utilised to tailor a response to a request message from a particular user such that a response message includes an additional page containing a special offer on a product registered as being of interest to a particular user.

The software further includes an integration engine 72 for communicating with routine activities such as invoicing and purchase ordering that can arise in response to use of the website by users of the remote user devices 2.

The software further includes an operations manager 73 for managing the overall system to control operation, to allow errors to be detected and to allow resources to be controlled accordingly.

Also provided is a program 74 for the creation of the policy objects at startup as described above with reference to FIG. 4.

The device identification engine 29 is also provided, as described above.

Also, a web application 75 processes the received URL request to identify the requested web page and select the appropriate document of content code 23 for import to the code generating engine 21.

Figure 8:
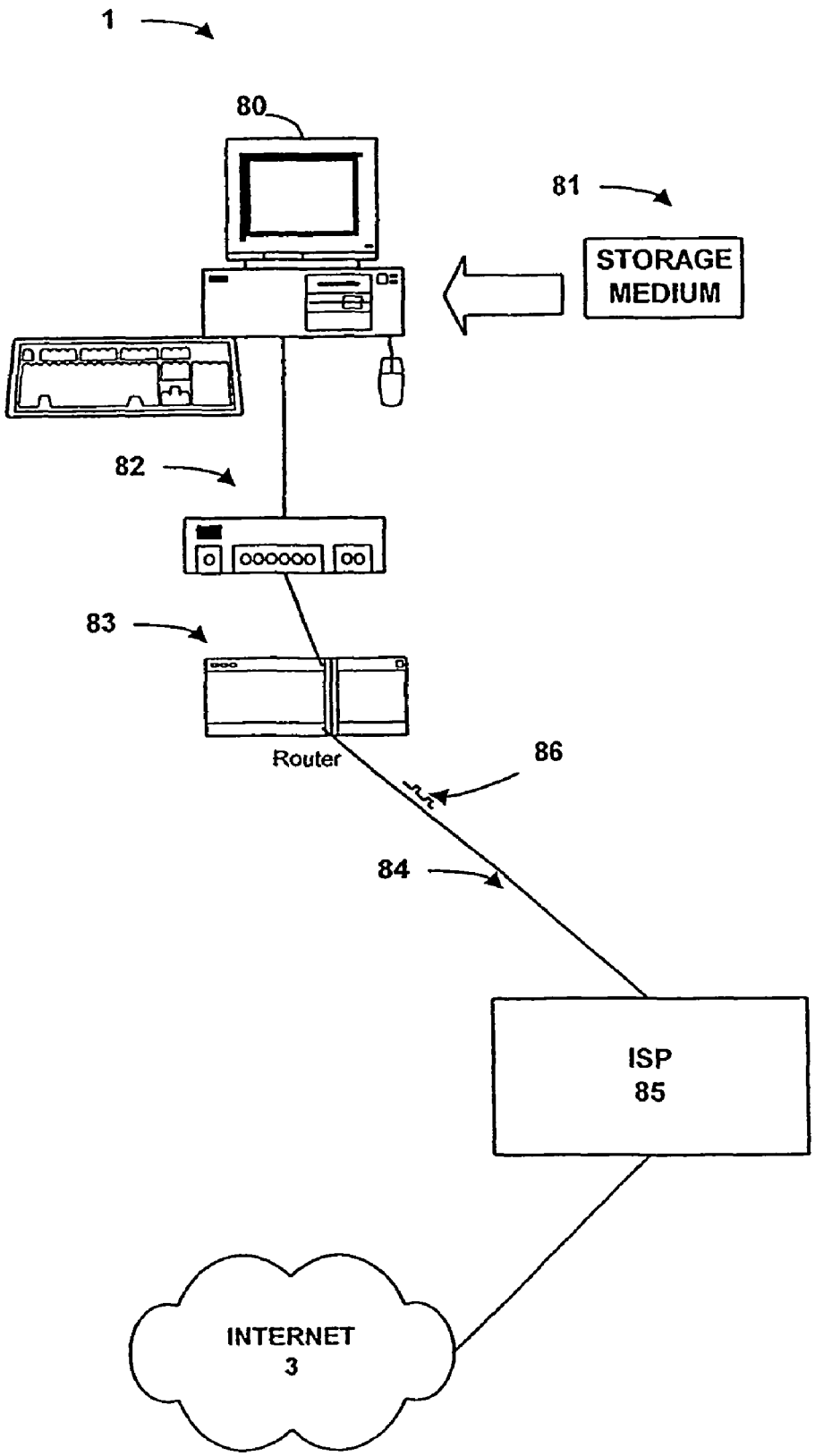
FIG. 8 illustrates schematically the hardware required by the web server.

FIG. 8 illustrates schematically a typical hardware required for implementing the present invention in a small to moderate sized web server. A personal computer 80 having facilities for receiving programs such as those summarised in FIG. 7 from a portable storage medium 81 is connected via a firewall 82 to a router 83. The router 83 is connected via a high bandwidth leased line 84 to an internet service provider 85 for connection with the internet 3.

Programs and data required for operating the web server 1 may be communicated from the service centre 5 in the form of the portable storage medium 81 or alternatively as signals 86 communicated via a network such as the internet 3.

Figure 9:
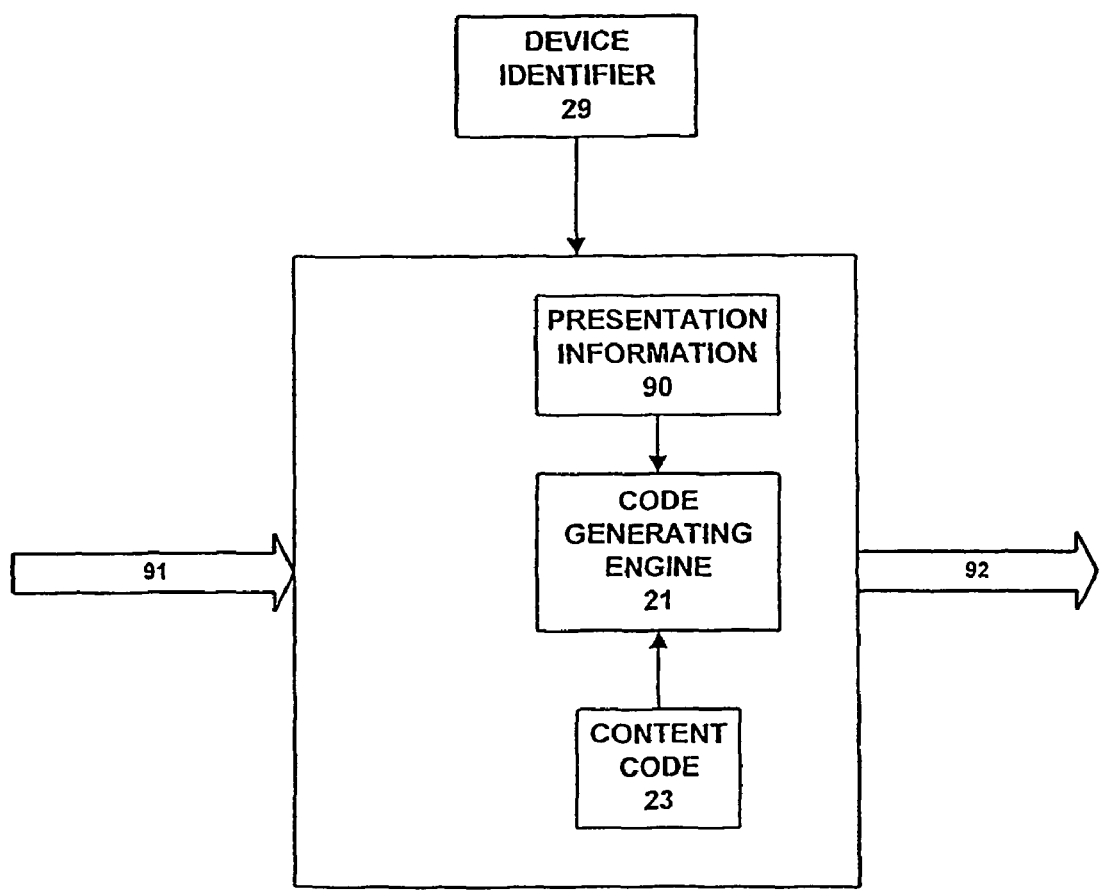
FIG. 9 illustrates schematically the separation of content code and presentation of information for use by the code generating engine.

As illustrated schematically in FIG. 9, the above described web server and software configuration allows content code 23 to be stored separately from presentation information 90 so that, when a request message 91 is received by the system, the code generating engine 21 is able to generate dynamically a response message 92 containing newly generated web page code representing the combination of content code and presentation information. A particular advantage of this arrangement is that it is relatively easy to alter presentation information such as style, and themes including logos for example, simply by updating the presentation information 90. Major re-engineering of the authored code is thereby avoided. Separate storage may involve location in separate files on the same hard disk or in physically separate memory devices.

To update the presentation information 90, it may simply be necessary to change data contained in the style policy table 32, the themes policy table 33 or the layouts policy table 35.

Figure 10:
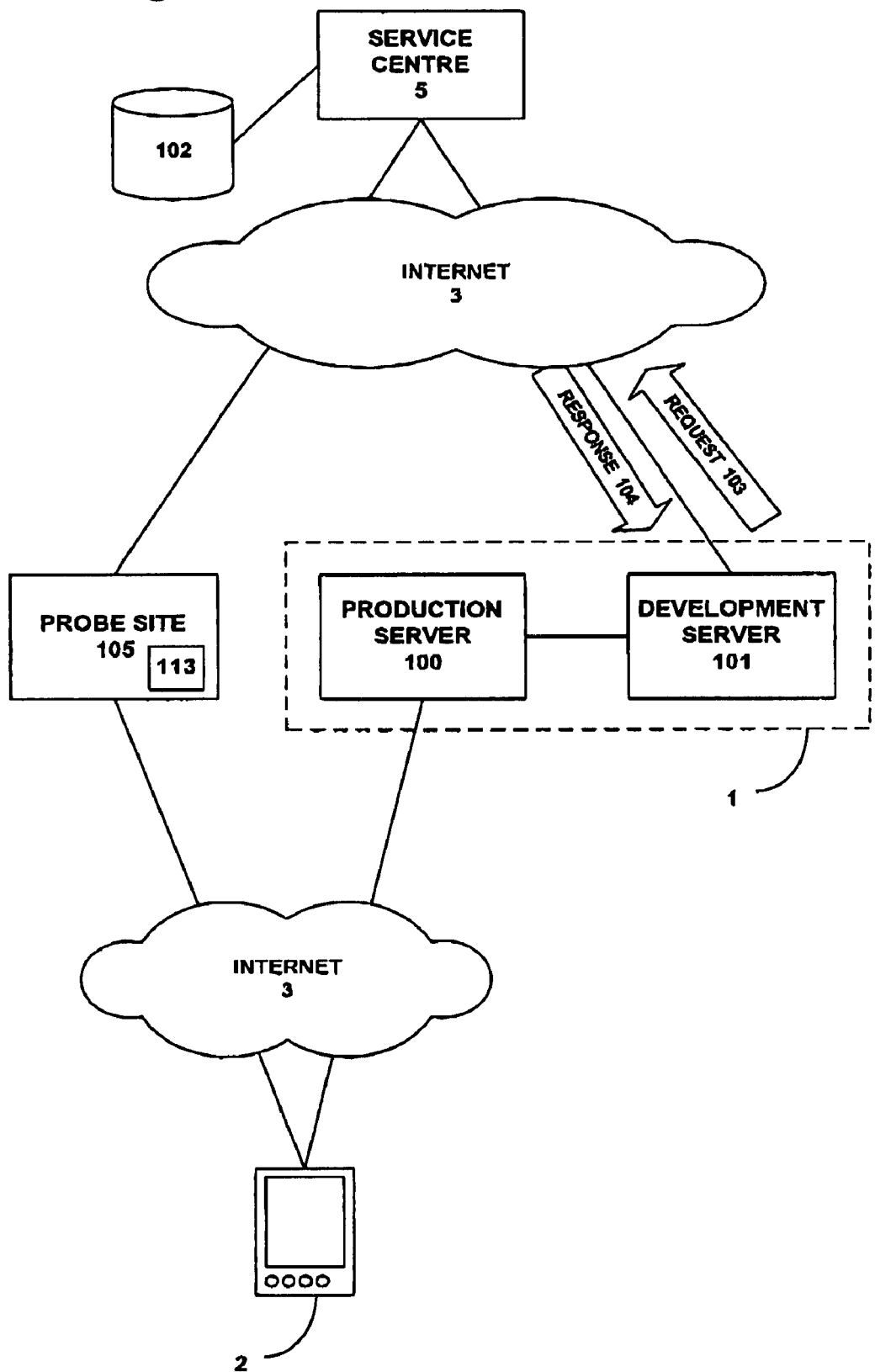
FIG. 10 illustrates schematically a system comprising a production server and a development server.

FIG. 10 illustrates schematically a preferred embodiment in which the web server 1 is adapted to operate in a business environment for a medium to large scale business. The web server 1 comprises a production server 100 responsible for the production of web page information in response to request messages from remote user devices 2 and the outputting of response messages comprising the web page code. As such, the production server 100 performs the functions described above as being performed by the web server 1 of preceding figures. Here the web server 1 also comprises a development server 101 which is responsible for interaction between the web server and the service centre 5 and for periodically updating the production server 100 with new software.

Each of the production server 100 and development server 101 comprises a respective processor cluster with substantially greater computing power than the personal computer 80 described above.

The development server 101 may be regarded as a series of processors performing development and staging processes enabling several levels of tests to be applied to new software before downloading the new software to the production server 100.

It is necessary for the software operated by the production server 100 to be updated periodically to take account of the evolution of new types of remote user device 2 and also to incorporate new content to be delivered as web pages.

As represented in FIG. 10, the service centre 5 maintains a central reference database 102 from which data such as updated policy tables is periodically communicated to the development server 101. This communication of data occurs using the Internet 3, an XML syntax being used to structure data transmitted using HTTP protocol. As illustrated in FIG. 10, the development server 101 periodically requests an update of the policy tables 40 by outputting a request message 103 and receives the requested data in a response message 104.

The development server 101 on receiving a response message 104 is used to conduct tests on the new data and may be used to make local adjustments for example to add appropriate new layouts.

After testing and modification, new policy tables are communicated from the development server 101 to the production server 100 via appropriate firewalls.

When updating databases in the production and development servers it is not generally necessary to transmit the entire contents of the database, instead relying upon editing commands constituting the transmitted data in HTTP protocol accompanied by metadata in the XML syntax.

Also illustrated in FIG. 10 is a probe site 105, the function of which will be described below, and which represents a server accessible via the Internet 3 and having a URL. The physical location of the probe site 105 is shown in the present example to be separate from the location of the web server 1.

Figure 11:
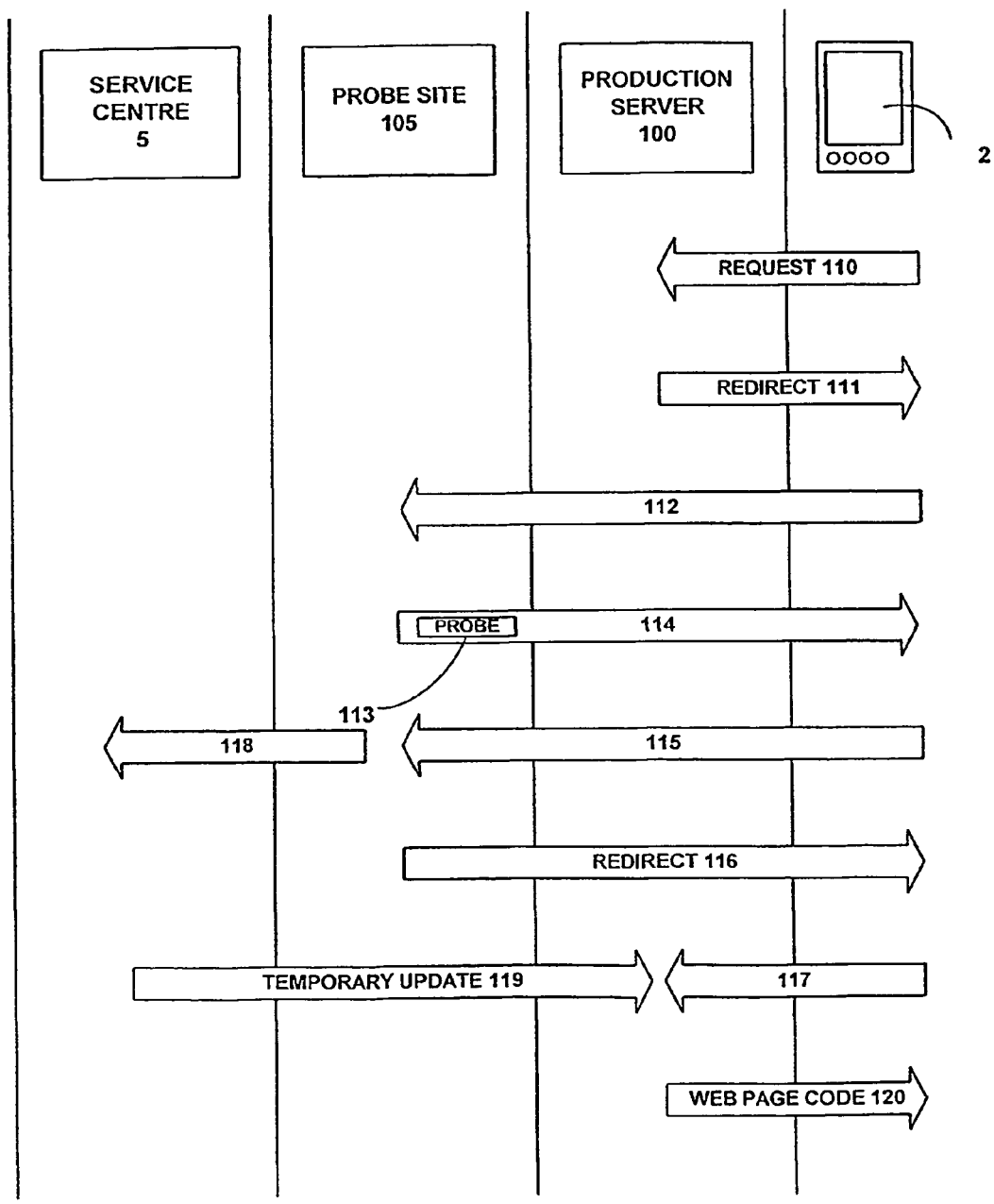
FIG. 11 illustrates the exchange of signals in the system of FIG. 10 when a new type of user device is encountered for the first time.

FIG. 11 illustrates schematically the manner in which the production server 100, probe site 105 and service centre 5 interact in response to an encounter for the first time with a remote user device 2 of a new type. The new type of device 2 may for example be the latest version of a mobile telephone using WAP and including features which are upgraded with respect to those of previous models by a given manufacturer, having for example different display capabilities such as an increased size and the ability to display colour images.

The user of the new device 2 wishing to access the web site provided by the web server 1 actuates browser software within the device to generate a request message 110 which is output via the Internet 3 to the URL of the production server 100.

The production server 100 receives the request message 110 and inputs the message to the device identification engine 229 shown in FIG. 2 in an attempt to extract a device type identifier from the ID string contained in the HTTP header of the request message. The device identification engine 29 however determines that the request message 110 contains an unknown identification stream. The production server 100 however needs a device type identifier to enable the appropriate policy tables to be accessed, the device type identifier 45 being an essential input to the code generating engine 21 as illustrated in FIG. 4.

The production server 100 responds to this determination by the device identification engine 29 by generating a redirect message 111 which is transmitted to the new device 2 and causes the device to redirect the request message 110 to the URL of the probe site 105. In consequence, a new request message 112 is output by the device 2 and transmitted to the probe site 105.

The probe site 105 analyses the identification string contained in the request message 112 and is able to extract some basic information as to the communication protocols and capabilities of the device 2. This limited information is sufficient to enable the probe site 105 to generate a probe 113 in the form of an agent which can be processed by the browser of the device 2 and constitutes software which can be run by the processor of the device.

The probe 113 is transmitted to the device 2 in a further message 114 and on receiving this message the browser of the device displays a standard response web page to the user while processing the probe in background.

The probe 113 causes the device 2 to generate a further request message 115 which is addressed to the probe site 105 and which contains more detailed information of the capabilities and protocols associated with the device 2, in accordance with the information requested by the probe.

The probe site 105 responds with a further redirect message 116 which is transmitted to the device 2 and instructs the device to redirect the request message 110 to the production server 100. The device 2 follows this redirection and outputs a further request message 117.

At the same time as outputting the redirect message 116, the probe site 105 sends a notification message 118 to the service centre 5 to inform the service centre of the existence of the new device 2 and to pass on the information retrieved in message 115 by the use of the probe 113.

The service centre 5 stores the received information for later use and processes the information to generate a temporary update message 119 which is transmitted to the production server 100 and contains a device identifier to enable the code generating engine 21 to generate the web page code as requested by the user of the device 2. The web page code is then transmitted to the user in a final response message 120.

The temporary update message 119 generated by the service centre 5 provides the production server 100 with the nearest appropriate existing device type identifier. Consequently, the web page code generated may not be perfectly suited to the new device 2 but will generally be capable of being interpreted and displayed by the device, for example using default settings of the browser.

The service centre 5 is then required to update the central reference database 102 with appropriate information including revised policy tables. This information may then be included in the next update communicated to the development server 101 for ultimately being used to update the database of the production server 100.

In this way, the above system is capable of continually reacting and adjusting to the evolution of new devices accessing web sites via the Internet, without necessarily being provided with advance notice by the manufacturers of the new devices or the direct provision by them of detailed technical data. Optionally, the service centre 5 may request such data by contacting the manufacturer, but this need not be obligatory to obtain satisfactory operation.

Figure 12:
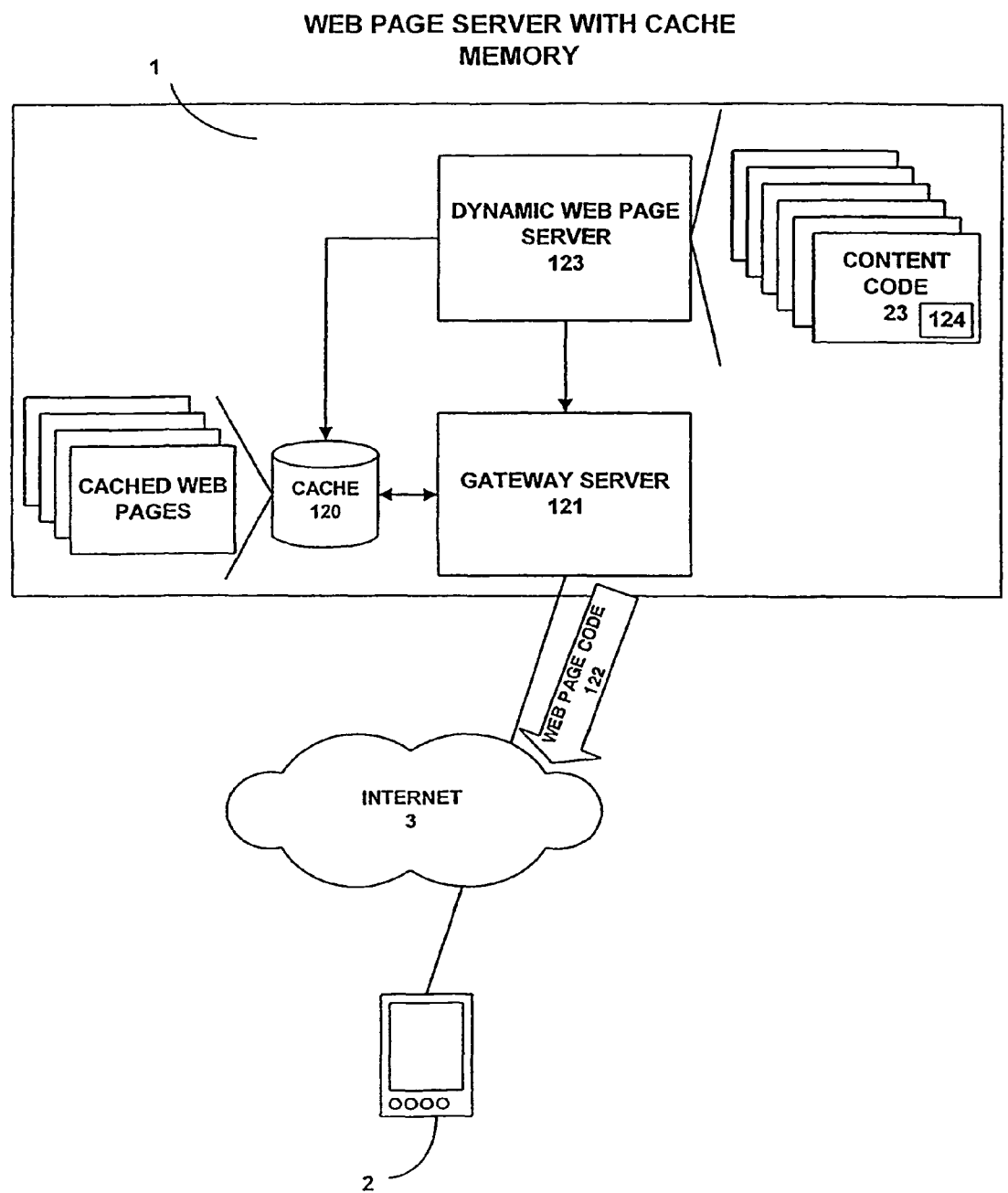
FIG. 12 illustrates schematically a server having a cache memory.

FIG. 12 illustrates an embodiment in which the web server 1 is provided with a cache memory 120. A gateway server 121 acts as a gateway interfacing with the internet 3 to receive request messages from remote user devices 2 and to respond by sending the requested web page code 122 either by requesting the dynamic generation of the web page code from a dynamic word page server 123 or, if the requested web page code already exists as a static web page in the cache memory 120, retrieving the web page code from cache memory.

The dynamic web page server 123 functions to dynamically generate the web page code in the manner described above using the device type identifier 45 extracted from the received URL request and the stored content code 23 corresponding to the URL.

Figure 13:
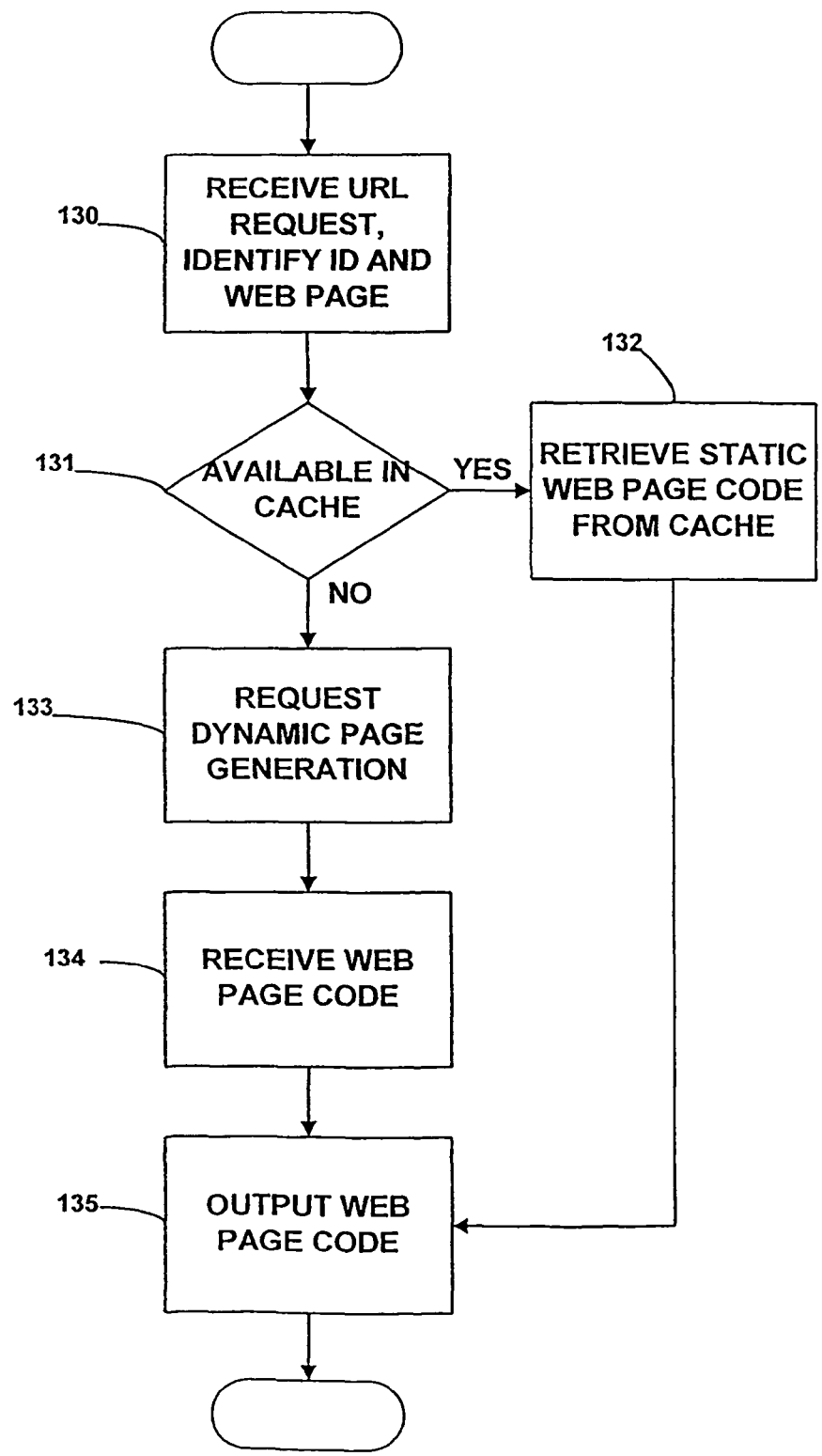
FIG. 13 is a flowchart illustrating the method of operation of a gateway server of FIG. 12.

FIG. 13 illustrates schematically the steps carried out by the processor of the gateway server 121. At step 130, the gateway server receives the URL request and extracts the device type ID 45 and identifies the document of the content code 23 which contains the instructions necessary for generating the required web page code.

At step 131, the gateway server 121 queries whether the web page code already exists as a static web page in the cache memory 120 for this device type ID and URL and, if available, retrieves at step 132 the web page code.

If not available from cache memory 120, the gateway server 121 requests at step 133 from the dynamic web page server 123 the generation of the web page code and transmits the device type ID and URL details.

Accordingly, at step 134 the gateway server 121 receives the newly generated web page code.

At step 135, the gateway server 121 outputs the web page code to the remote user device 2 via the internet 3.

Figure 14:
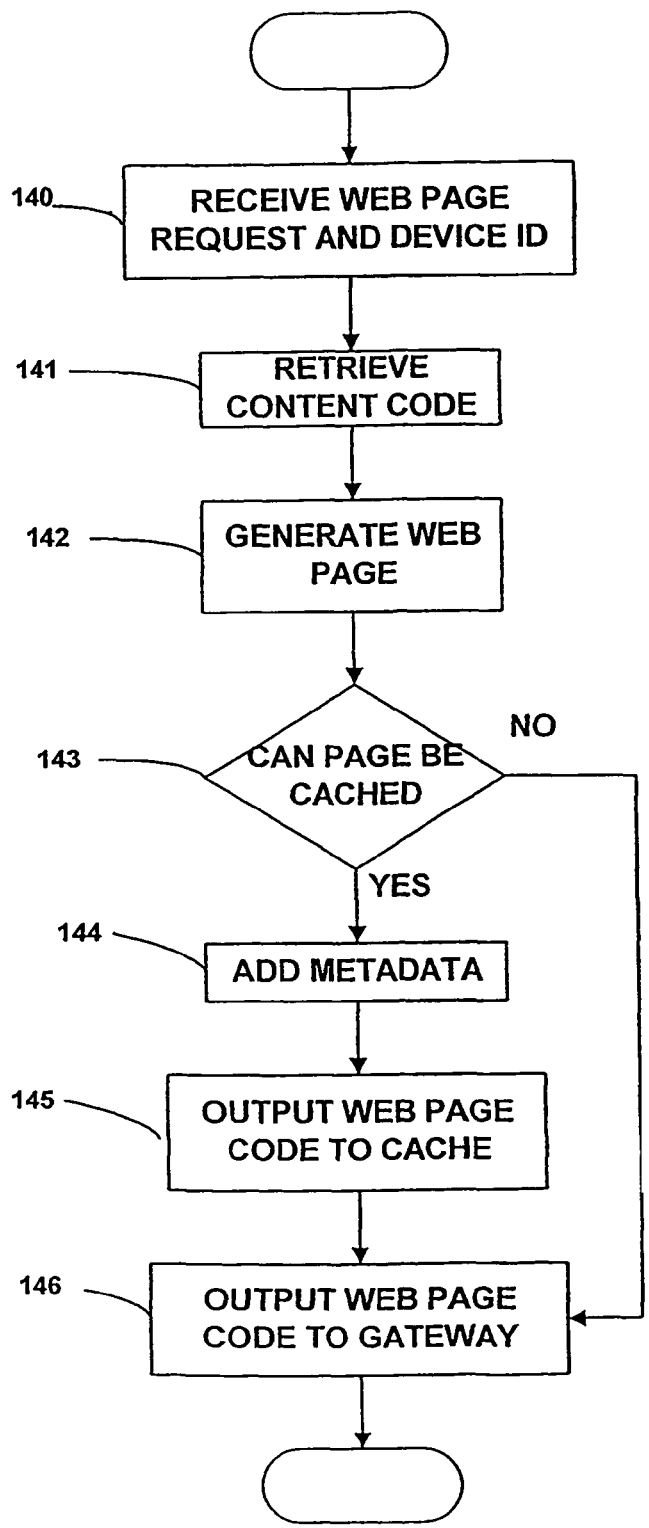
FIG. 14 is a flowchart illustrating operation of a dynamic web page server of FIG. 12.

FIG. 14 illustrates schematically the steps performed under the control of the processor of the dynamic web page server. At step 140, the dynamic web page server receives the request for generation of the web page code and also receives the device type identifier information and information derived from the URL required to identify the document of content code 23. The required content code 23 is retrieved in step 141 from memory and is processed in the run time environment 46 of the code generating engine 21 to produce the required web page code at step 142.

At step 143, the dynamic web page server 123 determines from the content code 23 whether the resulting web page code is flagged as being suitable for being stored in cache memory 120 and, if so, determines from the content code the period for which the cache memory version is to remain valid. This information at step 144 is used to create metadata which is added to the file containing the web page code and which at step 145 is output to the cache memory 120 to be stored for the validity period.

At step 146, the dynamic web page server 123 outputs the web page code to the gateway server 121 to be received at step 134 as described above.

When authoring the content code 23, the author therefore has the option of adding extra attributes to canvas tags to define whether or not the resulting page can be cached and how long it can remain valid in cache memory. The cache memory 120 writes new cached pages into memory in the manner which overrides any stored pages for which the validity has expired.

In FIG. 12, a set of pages of content code 23 is represented schematically together with respective cache memory control data 124 for each page, the control data being set by the author of the page to determine the above instructions for caching in memory 120.

The generation of code by the code generating engine 21 has been described above with reference for example to appendix 1 which shows instructions used for creating content code 23 for generating an example web page. Typically, as in this example, the execution of the content code 23 by the code generating engine 21 will require content to be retrieved from date storage. Data objects such as image files are therefore imported for inclusion in the web page code which is to be output by the code generating engine 21.

The author of the web page may author a component to refer by name to a data object to be imported. Different versions of the data object are stored in a data structure which is hierarchical and such that different hierarchical levels correspond to different capabilities of remote user devices 2. The author of the content code 23 may define for each object the appropriate version to be utilised for each device type ID 45 by entering data in a in component policy table 37 as illustrated in FIG. 3. The component policy table may then follow the hierarchy of FIG. 6A to enable the data object version to be defined for each possible device type ID. This approach is referred to hereafter as defining data objects in terms of targeted content since it is the author of the code which targets the particular version of the data object to be used for each remote user device 2.

Figure 15:
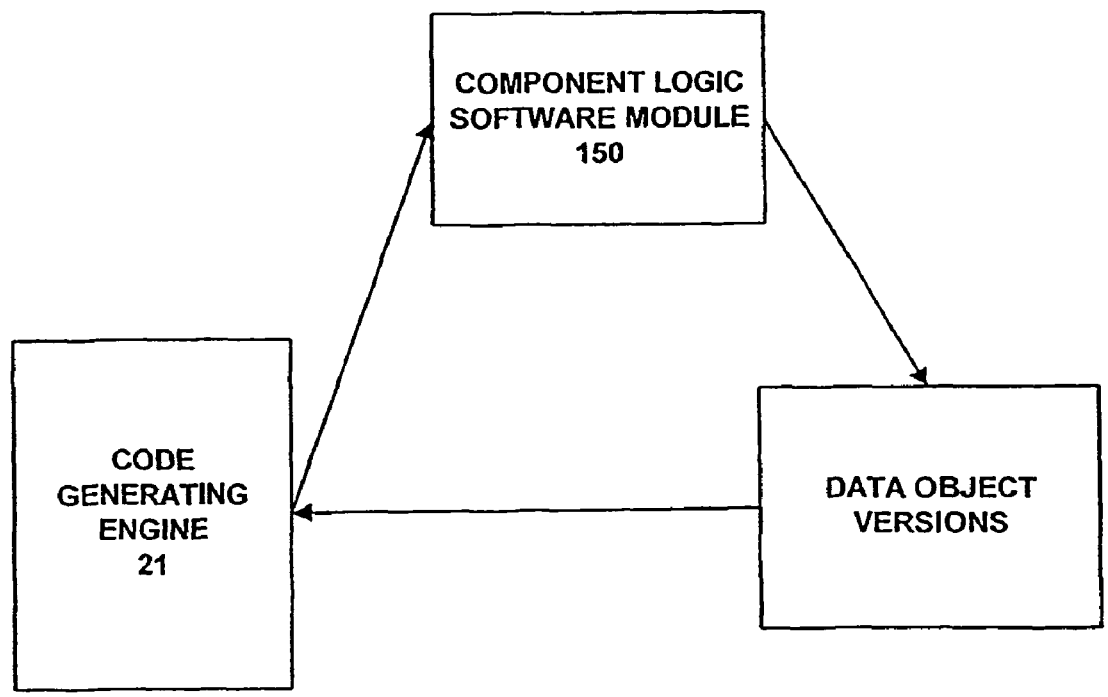
FIG. 15 is a schematic diagram illustrating a component logic software module.

Alternatively, a number of versions of data object may be provided in a hierarchy with characteristics of each version of the data object being described in associated metadata for each version. Automatic selection of the appropriate version may then be made using a component logic software module 150 as illustrated schematically in FIG. 15.

The component logic software module 150 selects the appropriate version on the basis of the data object metadata, layout considerations defined by the layout policy table 35 and information about the device provided by the device policy table 30. This approach to selection of the data object version will be referred to below as untargeted content selection.

The code generating engine 21 may operate using either one of targeted content or untargeted content selection. Alternatively and preferably, the code generating engine 21 is capable of selectively making use of both targeted content and untargeted content selection, thereby providing the author with the freedom when authoring the content code 23 to either define data object versions or leave selection to be automatically processed using the component logic software module 150.

Figure 16:
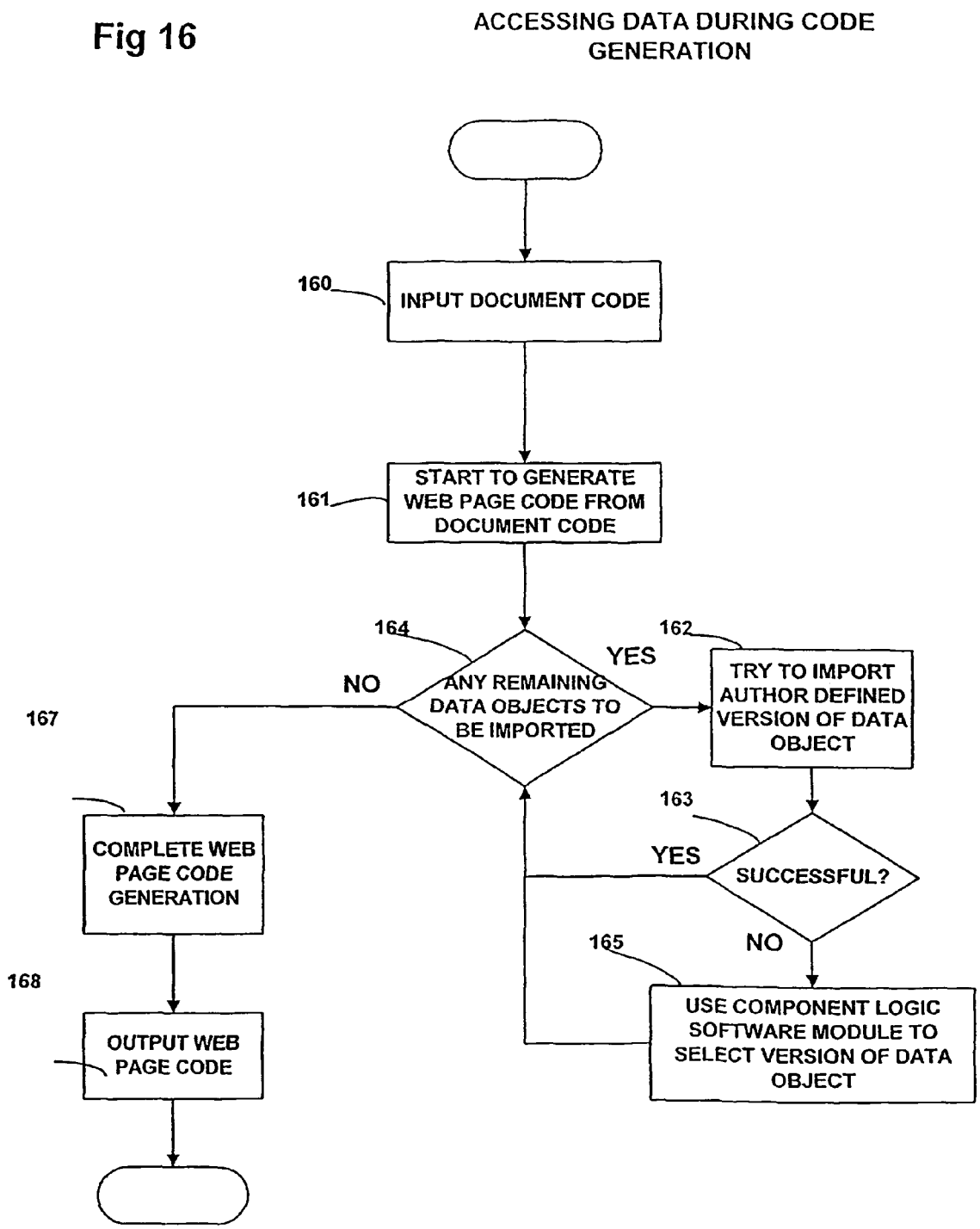
FIG. 16 is a flowchart illustrating operation of code generation using the component logic software module.

FIG. 16 illustrates schematically the manner in which both targeted and untargeted content may be utilised. At step 160, content code 23 is input to the code generating engine 21 together with the device type ID 45 and at step 161 the processing of the code is started.

At each instance of a component of the content code 23 requiring a data object to be imported, the code generating engine 21 attempts at step 162 to import an author defined version of the data object. If it is determined at step 163 that such an author defined version exists and it is successfully imported, processing continues, determining at step 164 whether any further data objects remain to be imported.

If however at step 163 it is not possible to successfully import any author defined version, processing continues with step 165 which requires operation of the component logic software module to identify the appropriate object version. At step 165 the selected data object version is then imported and the code generating process continues. When it is determined at step 164 that no further data objects are to be imported, the remaining processing to generate the web page code is completed at step 167 and at step 168 the completed web page code is output.

Figure 17:
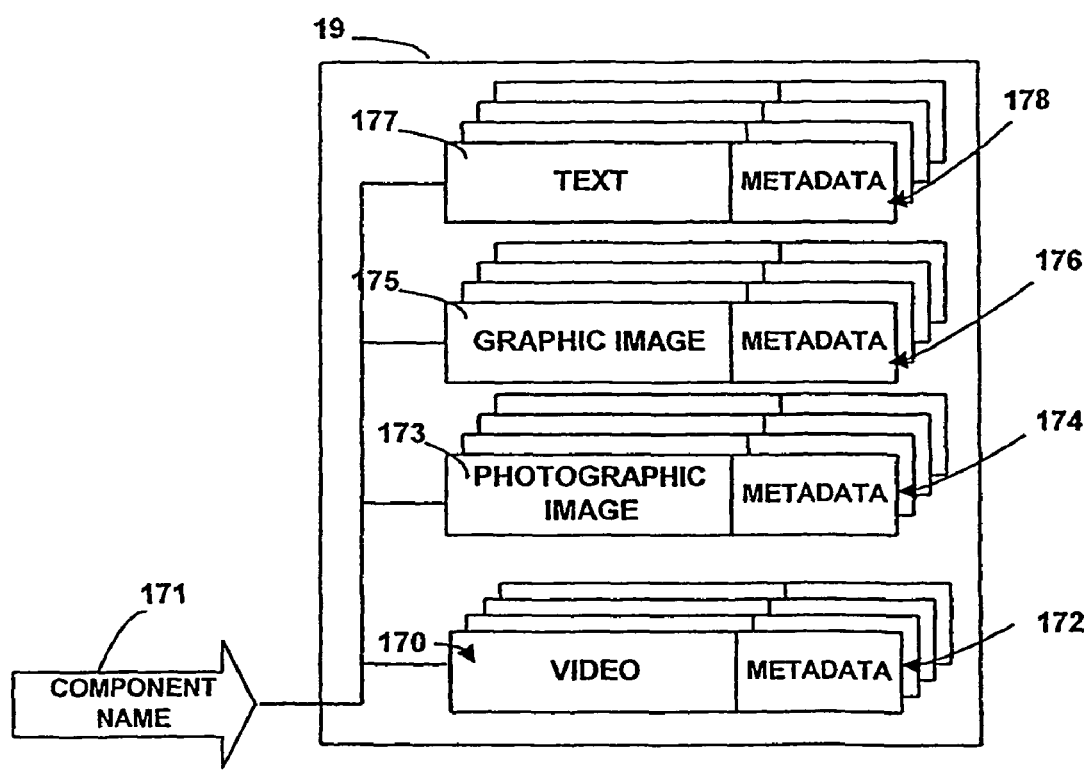
FIG. 17 is a diagram illustrating the hierarchy of data objects which are different versions of data referenced by a single component name.

FIG. 17 illustrates schematically the manner in which data objects stored in the database 19 are stored in a hierarchical data structure to allow the component logic software module 150 to automatically select the appropriate data object version.

If for example the author designs a web page in which a video clip is to be displayed at a defined area of the screen of a user device in the form of a personal computer, the video clip is stored in the database 19 as a video data object 170 and an associated component name 171 is devised to enable the code generating engine 21 to reference the video data object 170 by name. The video data object 170 is characterised by metadata 172 stored in association with the data object and contains data fields sufficient for the component logic software module 150 to make a determination as to whether a given user device 2 as defined by device type identifier 45 is capable of receiving and displaying the video clip from the data object.

The author may also store, as shown in FIG. 17, different versions of the video data object suitable for use by different device types, each accompanied by respective metadata.

The author also stores in the database a photographic image data object 173 with associated metadata 174. Similarly, the author may store a set of related photographic image data objects 173 having attributes appropriate to different device types and accompanied by respective metadata. If the component logic software module 150 determines from the metadata 172 that none of the video data objects can be displayed by a user device for which the web page code is currently being prepared, the photographic image represents a fall back position enabling a static photographic image to be rendered in place of the video clip. The photographic image will therefore generally display related subject matter and may for example comprise a still taken from the video clip.

The author may also enter into the database a graphic image data object 175 with associated metadata 176. Similarly, the author may enter a set of related graphic image data objects with respective metadata, suited to different device types. The graphic image constitutes a further fall back position for use if an appropriate version of photographic image is not available.

The author may also enter additional fall back positions such as simple text objects 177 with associated metadata 178. The text data object 177 represents a final fall back for situations where the component logic software module 150 determines that even the graphic image 175 cannot be rendered by the user device 2.

The data objects 170, 173, 175 and 177 are stored in the database 19 in a hierarchical data structure as illustrated schematically in FIG. 17 in which different levels of the hierarchy correspond to levels of user device capability. The text data object 177 is in this example a root level of the hierarchy representing the lowest level of capability of the user device 2 and therefore representing the ultimate fall back position.

If for example the user device 2 is identified by device type identifier 45 as being a personal computer, the component logic software module 150 will select data object 170. If the user device 2 is identified as being a pocket PC without the ability to render video clips, but having the ability to render photographic images, the component logic software module 150 will select data object 173. If the user device 2 is identified as being a mobile telephone with WAP facilities, the module 150 will select the graphic image data object 175. If however the user device 2 is identified as being a conventional mobile telephone without WAP facilities then text data object 177 will be selected.

The hierarchical data structure applies to other types of data object to enable appropriate data objects to be selected, as for example in the case of the web page code defining a link of some sort. The link may comprise an HTML link, a WML link, an email link or simply a telephone number for autodialled connection in the case of the user device 2 being a mobile telephone.

A further example of data objects which can be accessed using the same component name is that of script components such as JAVASCRIPT and WML Script where the same content may be written in the appropriate script for use in different devices. The author may therefore write data objects in the variety of required script languages for storage in the hierarchical structure of FIG. 17 and retrieval in response to component name. As in the previous examples, selection may be made on the basis of the metadata accompanying each data object on the basis of the capabilities of the remote user device 2, as determined by using the device type identifier 45 with reference to the device policy table.

The use of the above hierarchical data structures provides an efficient method of asset management for the system where the assets comprise the collection of data objects which are capable of being delivered in web page code form by the system.

Figure 18:
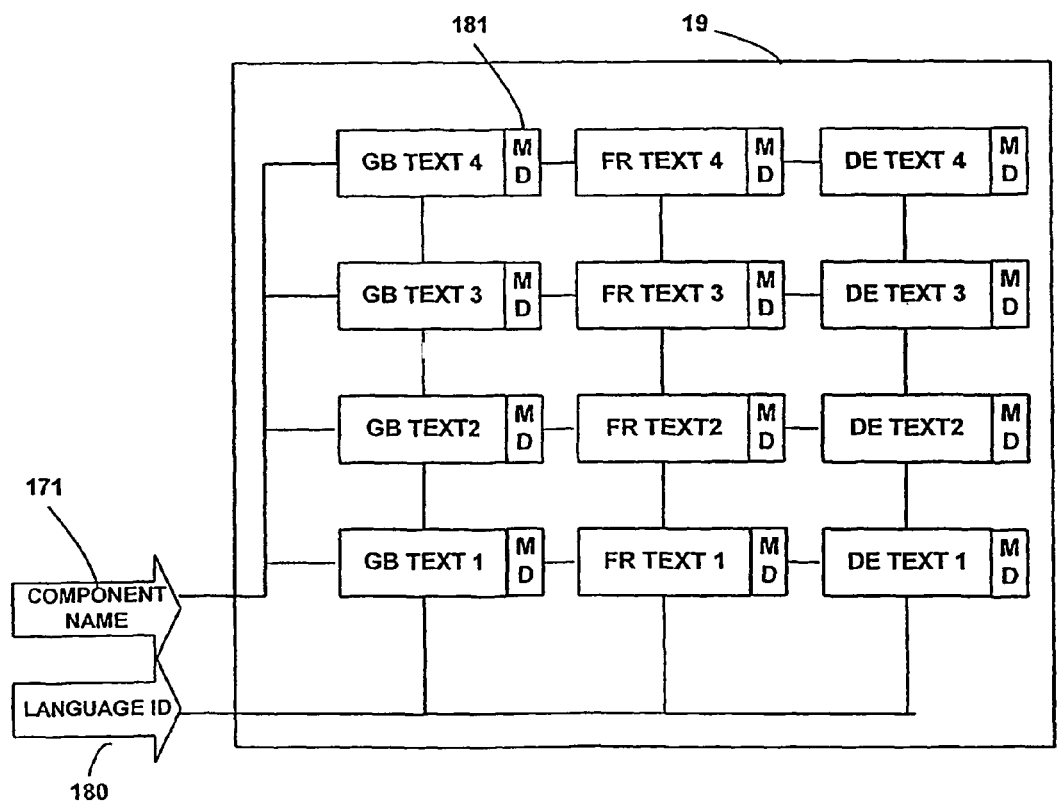
FIG. 18 illustrates the hierarchy of text objects with different text code sizes and languages.

FIG. 18 illustrates the manner in which data in the form of text may be stored in a hierarchical data structure to enable different versions of the text to be retrieved to suit the capabilities of the user device 2 and the preferences of the user. The full text in English of a document object is stored in box GB TEXT 1, suitable for example for display on the screen of a PC. A reduced version of the text which has been edited by the author is stored as data object GB TEXT 2, suitable for display on a palm held computer of reduced screen size. A smaller still version of edited text is stored in data object GB TEXT 3, suitable for display in a hand held device of limited memory and finally GB TEXT 4 contains a minimal text version for display in a mobile telephone.

Each of these text versions are in the English language. Corresponding text objects in the French language are contained in FR TEXT 1, FR TEXT 2, FR TEXT 3 and FR TEXT 4. Similarly, data objects containing text in the German language are contained in DE TEXT 1, DE TEXT 2, DE TEXT 3 and DE TEXT 4.

The data objects are addressed by component name 171 and a language identifier 180 which in this example indicates whether the English, French or German text version is required.

The language identifier is input to the code generating engine in addition to the device ID 45 and typically is extracted from the body of the request message generated by the browser of the remote user device 2 in response to input of a user preference by the user. Each of the text data objects such as GB TEXT 1 has associated metadata 181 indicating the relevant parameters of the object, including in particular the size of code representing the text. A decision may thereby be made on the basis of the size of the code indicated by the metadata 181 as to whether a given object is appropriate for retrieval for a given remote user terminal. The optimum data object may thereby be selected by traversing the hierarchical tree structure of FIG. 18 until the appropriate data object is located.

Figure 19:
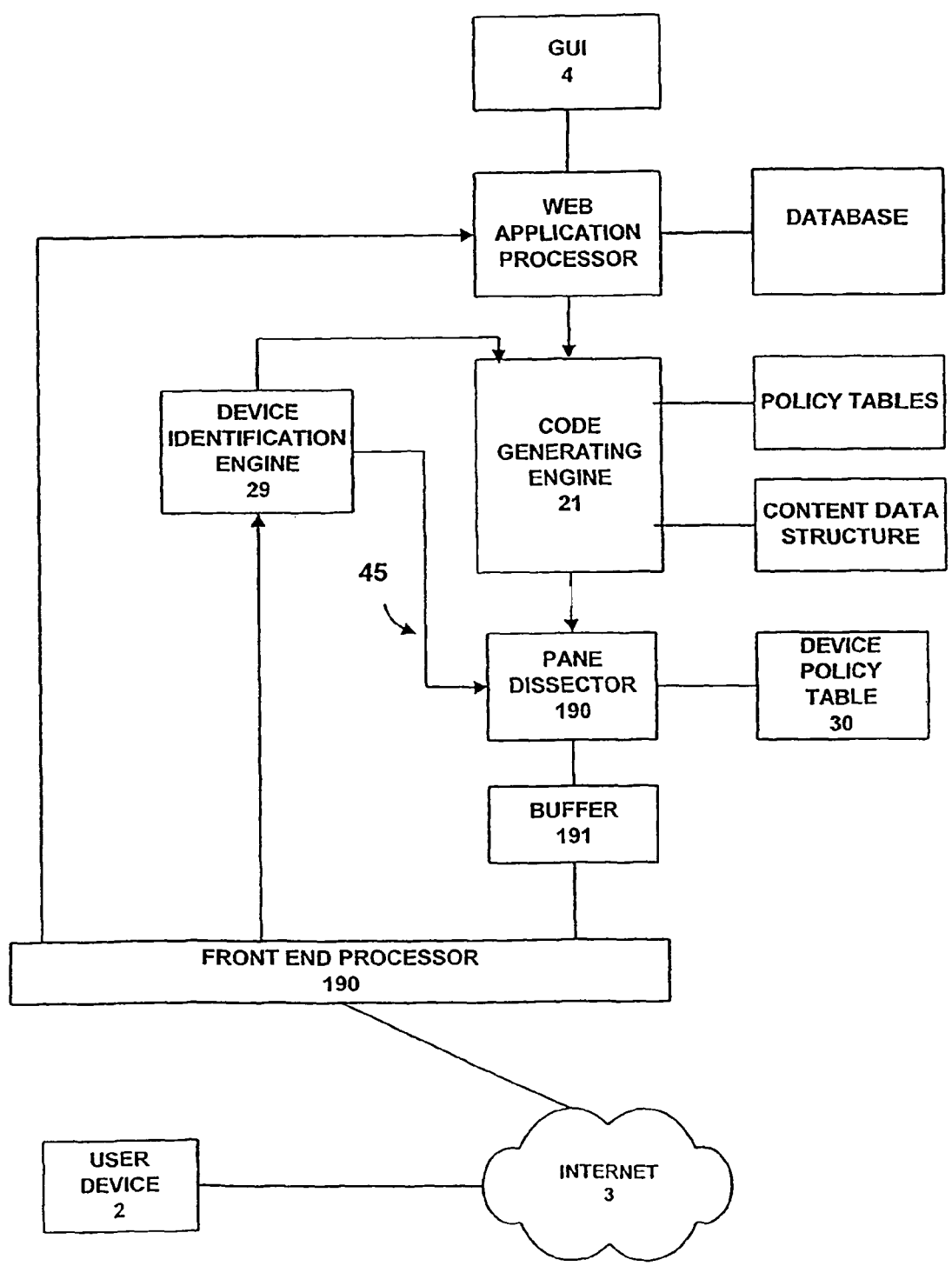
FIG. 19 illustrates the signal flow in a web server in which pane dissection occurs.

FIG. 19 illustrates a further embodiment in which a pane dissector 190 is provided to modify the output produced by the code generating engine 21. Such an arrangement is advantageous in preventing the transmission of a response message containing an amount of code which is greater than the available memory capacity of the remote user device 2. For small memory devices such as mobile telephones, overloading the available capacity can cause the microprocessor of the device to crash or enter a lock situation. Although the author of the content to be provided in response to queries from such devices may take note of the limited memory capacity of the device, it is in practice difficult to predict with certainty the actual amount of code which will be output from the code generating engine 21 so that a solution is to additionally place a device such as the pane dissector 190 downstream of the code generating engine 21 to trap the outgoing code and measure the code amount.

If the code amount exceeds the indicated available data capacity of the user device 2, the dissector 190 is arranged to automatically divide or dissect the document into a number of fragments, referred to herein as shards.

As illustrated in FIG. 19, the pane dissector 190 receives the device type identifier 45 from the device identification engine 29 and addresses the device policy table in order to determine from the device type identifier the available memory capacity of the user device 2.

If division of the pane is appropriate, a first one of the resulting shards is output by front end processor 190 and the remaining shards are stored in a buffer memory 191. The front end processor 190 may then respond to subsequent requests from the user device 2 by supplying in turn the remaining shards in respective response messages.

Figure 20:
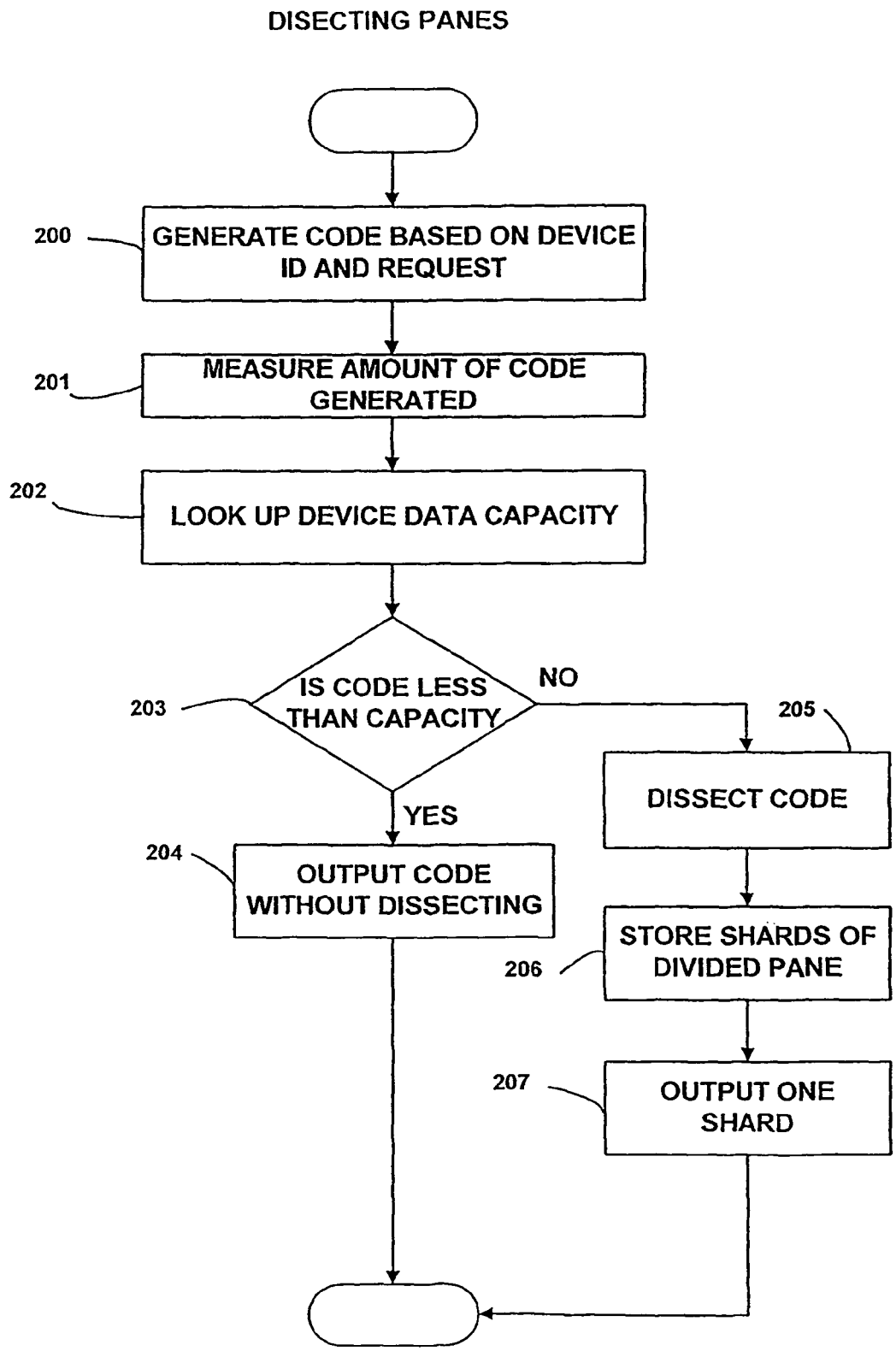
FIG. 20 is a flowchart illustrating pane dissection.

FIG. 20 illustrates schematically the process of dissecting a pane, the term pane in this context being used to indicate a web page intended to be transmitted to a remote user device 2.

At step 200, the code representing the pane is generated by the code generating engine 21, based on the device type identifier 45 and the nature of the request message received via the internet 3.

At step 201, the code output from the code generating engine 21 is received and measured by the pane dissector 190 and at step 202 the pane dissector accesses the device policy table to look up the data capacity of the remote user device 2.

At step 203, the pane dissector 190 determines whether or not the amount of code is equal to or less than the data capacity of the remote user terminal 2 and, if so, at step 204 outputs the code without performing any dissecting step.

If however the amount of code is greater than the available data capacity, the dissector at step 205 dissects the code into a number of shards, each shard having an amount of code less than the available data capacity. At step 206 the shards of the divided pane are stored in buffer memory 191. At step 207 one of the shards is output to the server for inclusion in a response message to the remote user device 2.

Figure 21:
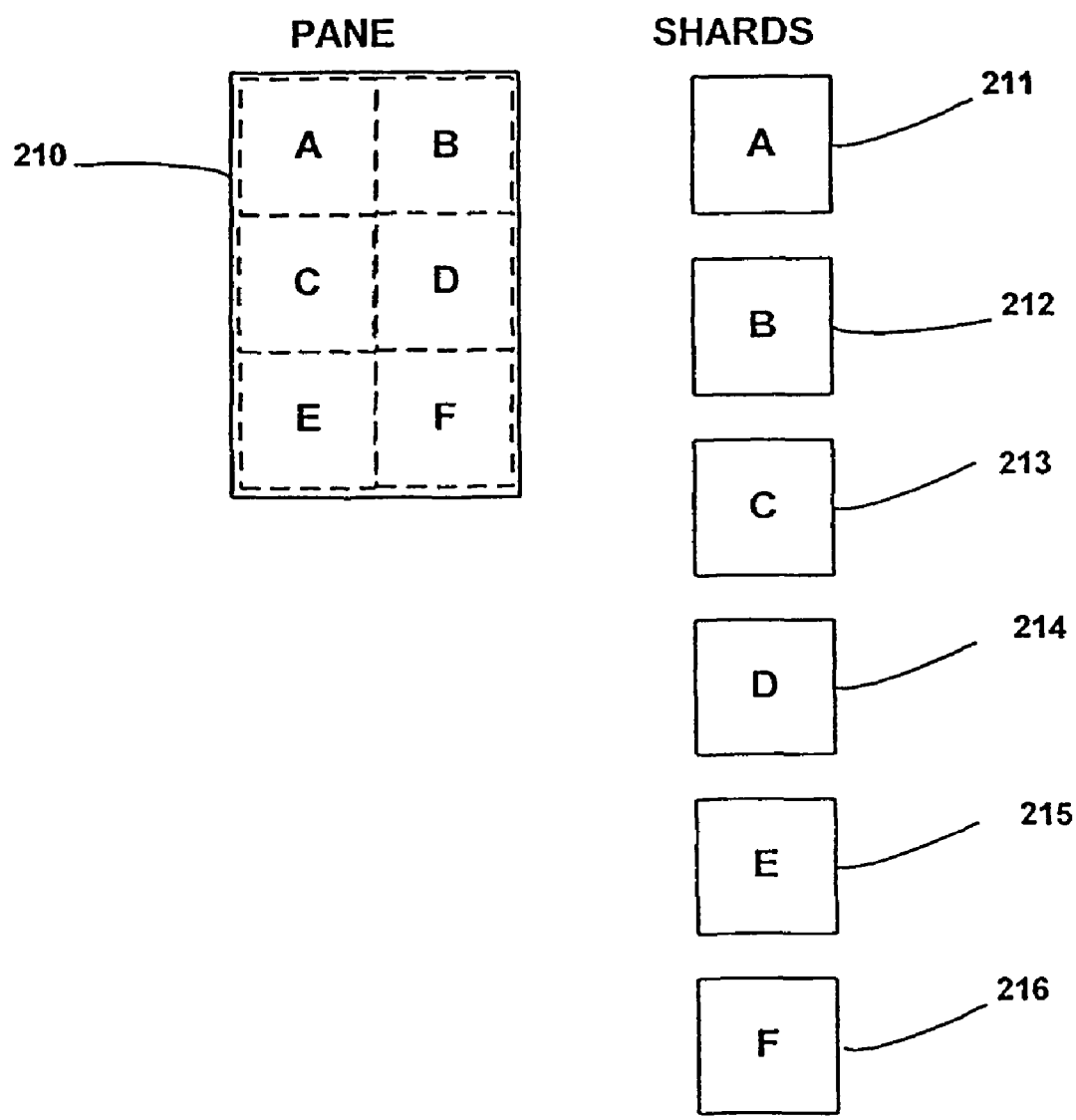
FIG. 21 illustrates the dissection of a pane into shards.

FIG. 21 illustrates a pane 210 from which regions A, B, C, D, E and F are dissected to form shards 211 to 216, each of which is separately stored in the buffer memory 191 and may be transmitted in separate response messages to the remote user device 2.

Figure 22:
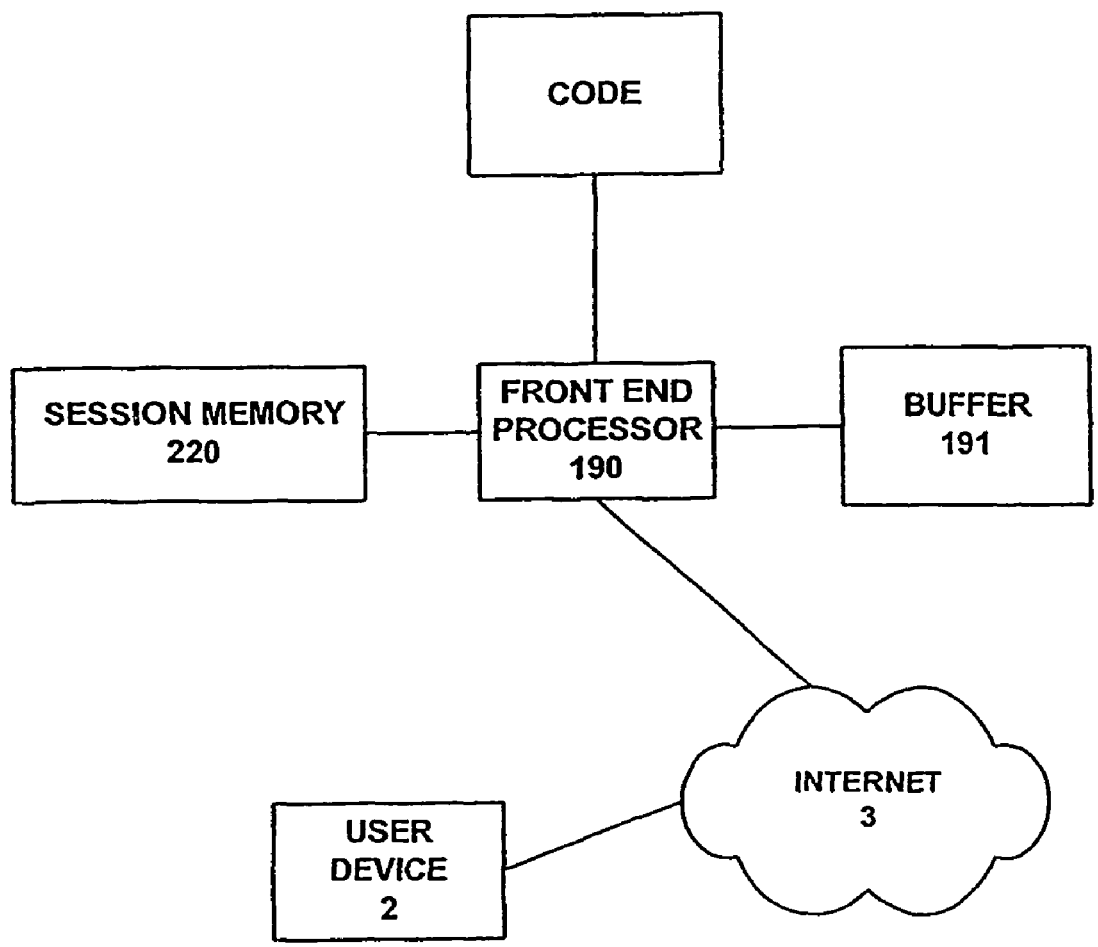
FIG. 22 illustrates use of a user session memory during form filling.

FIG. 22 illustrates the additional use of a memory referred to below as a user session memory 220 for storing information defining a user session under circumstances where the messages between the server and user device 2 are fragmented to take account of the limited data capacity of the user device.

A typical example of when such an arrangement is appropriate is when a form filling exercise is to be completed in a user session. For high capacity devices such as personal computers, it is commonplace for a form to be provided in a single screen to the user and for the form to contain multiple fields for completion by the user.

Figure 23:
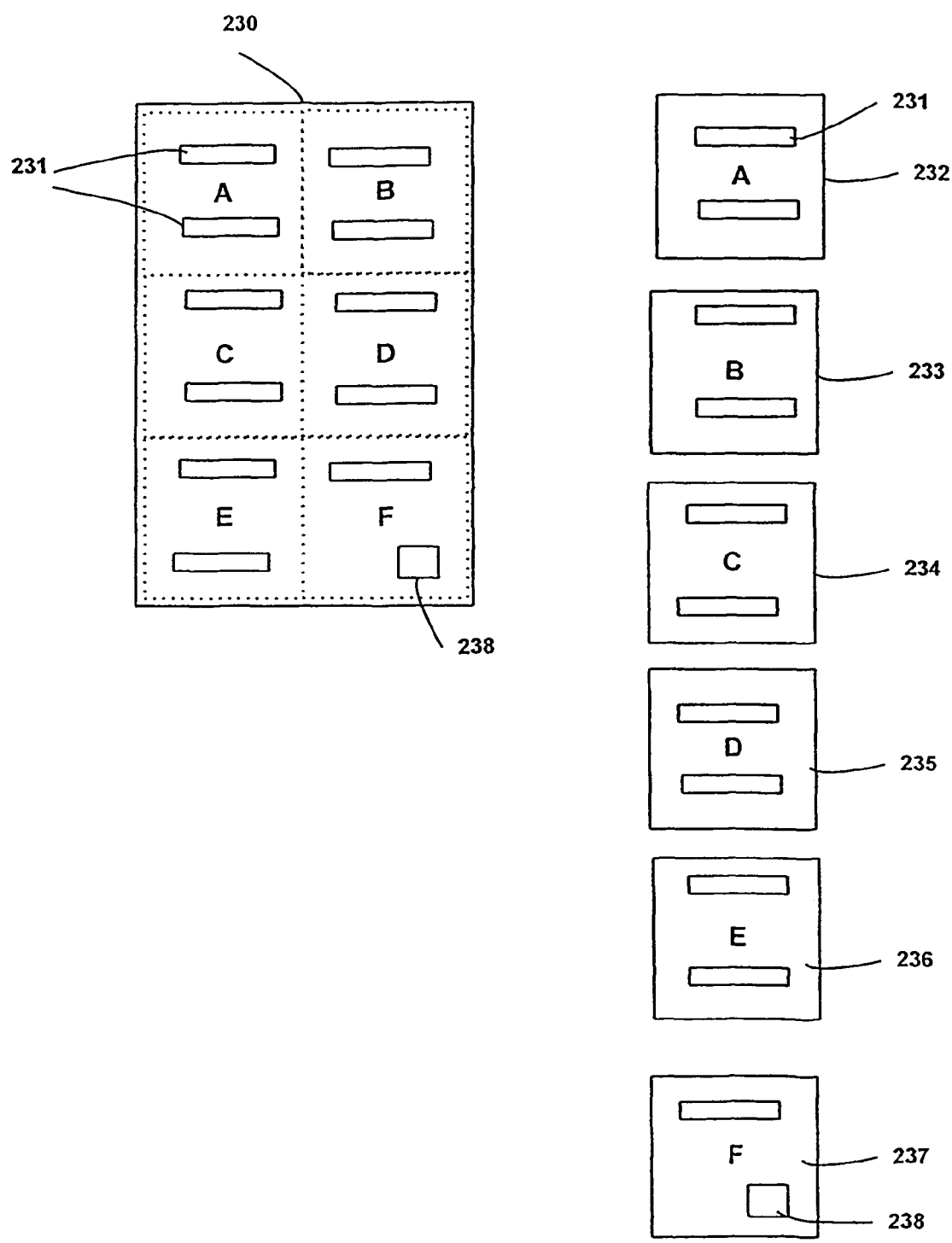
FIG. 23 illustrates the dissection of a pane used in form filling.

For example, in FIG. 23 form 230 defines multiple data fields 231. For a device 2 of limited capacity, it may be necessary to fragment the form into a number of fragments 232 to 237 which contain respectively portions A, B, C, D, E and F of the form 230.

During a user session, the form 230 is dissected into the fragments 232 to 237 and the corresponding code for each fragment stored in buffer 191. Initially only fragment 232 is transmitted to the user device 2 and the user responds with a response message which is processed by the server 1. The response corresponding to data fields contained in region A of the form are stored in the user session memory 220. The next fragment 233 is transmitted to the user device and the corresponding response stored in the user session memory. This process is repeated until the final fragment 237 is transmitted. The response to this fragment F of the form includes actuation of a submit button 238. If actuation of the submit button 238 is contained in the final response message, the information required in the user session memory 220 is complete and the complete set of data from the form filling exercise is passed to a data processing application 239.

The manner in which the form is divided into regions A, B, C, D, E and F is defined by the author as part of the layout policy.

The code transmitted to the user device 2 typically also includes script defining instructions for operating the browser of the remote user device 2 to perform validation and verification of data entered by the user during form filling. The script is generated by the code generating engine 21 based on the tags written by the author who includes a definition of validation rules to be applied to the data entered by the user during form filling.

If for example a data field is indicated as being a numerical field, numerical value limits may be applied for validation purposes.

The manner in which the script code is generated by the code generating engine 21 depends upon the version of script language appropriate to the remote user device 2, as indicated by the protocol policy.

In a further example, a user device 2 is of a type with limiting processing power such as a mobile telephone in which validation rules are applied by software existing in the processor or SIM card of the device. In this instance, the code generating engine 21 is not required to generate script for transmission to the device to perform the validation steps since it is sufficient to provide validation parameters in a format dictated by the existing software within the user device.

When responding to a remote user-device 2 which uses a protocol supporting style sheets, the author may specify that a style sheet is to be generated by the code generating engine 21. The style sheet may be shared across multiple pages. For those devices where the available protocol does not support style sheets, additional code is generated by the code generating engine 21 to create a visual effect in the resulting displayed pages which emulates the style sheet definition defined by the author.

For example, HTML 4 browsers can apply style sheets to received HTML whereas HTML 3 browsers cannot. It is therefore necessary for HTML 3 browsers to receive additional HTML code adding font, colour and other attributes in order to achieve the same effect as provided by the style sheet.

The author is required to define the style sheet information and the code generating engine 21 will, if necessary, automatically generate the additional code required if style sheets are not supported.

Some user devices do not provide visual display, as for example those devices designed for use by visually impaired users. Such devices are typically served by a service provider which hosts a voice browser on a computer of the service provider, thereby converting HTTP received code into communications signals delivering voice messages. Such a service provider could therefore act as an intermediary between the server 1 and the remote user device 2 of the above embodiments. The output web page code could then advantageously be output by the code generating engine in voice XML.

Figure 24:
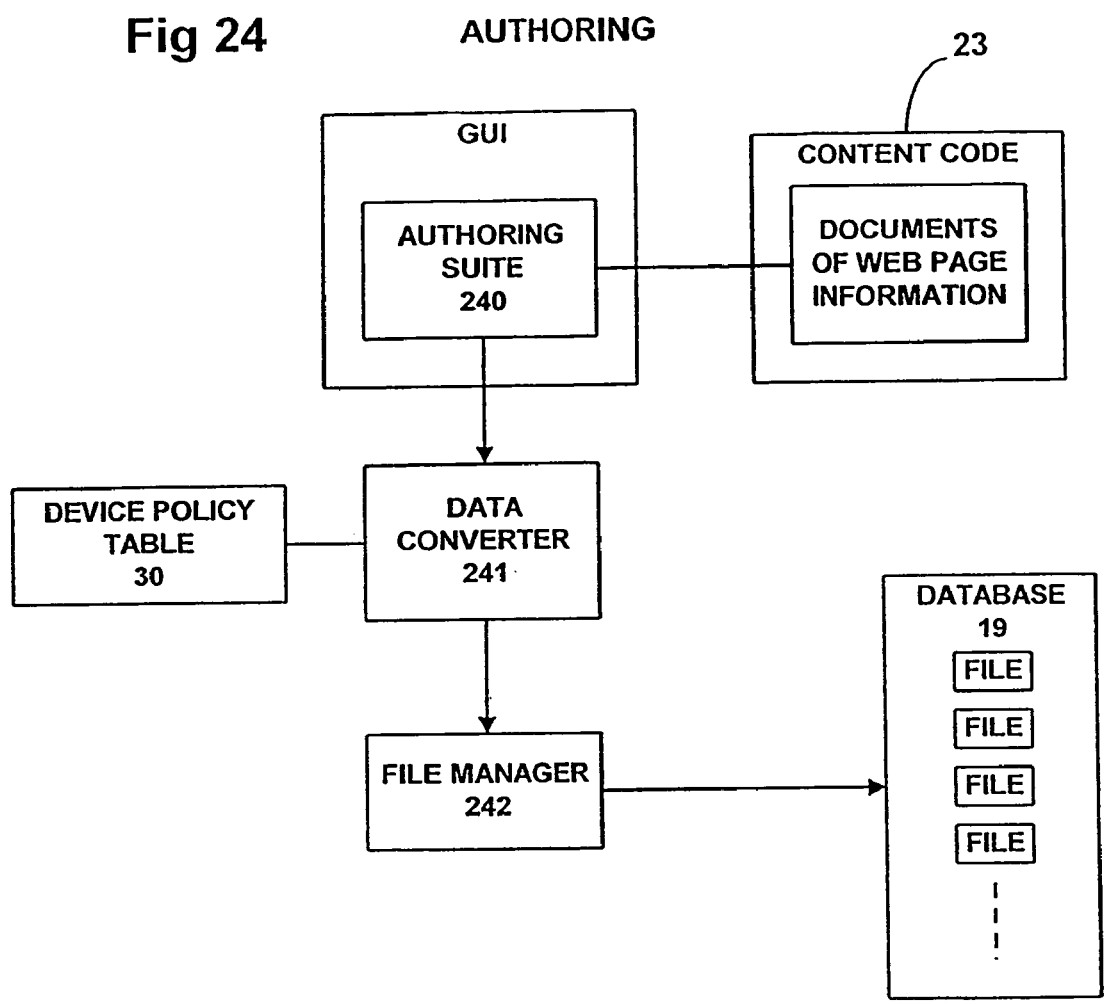
FIG. 24 illustrates the function of the graphical user interface.

FIG. 24 illustrates one of the functions of the graphical user interface 4 utilised when storing files created during web page authoring. A common situation arises where the same background image and text are to be incorporated into web pages downloaded to a number of different device types requiring different formats. A data converter 241 is provided in accordance with a further embodiment of the present invention to assist the author in the task of generating appropriate files. As shown in FIG. 24, an authoring suite 240 is provided with a data converter 241 for converting a data file output by the authoring suite into a set of files which are stored by action of a file manager 242 in the data structure.

Figure 25:
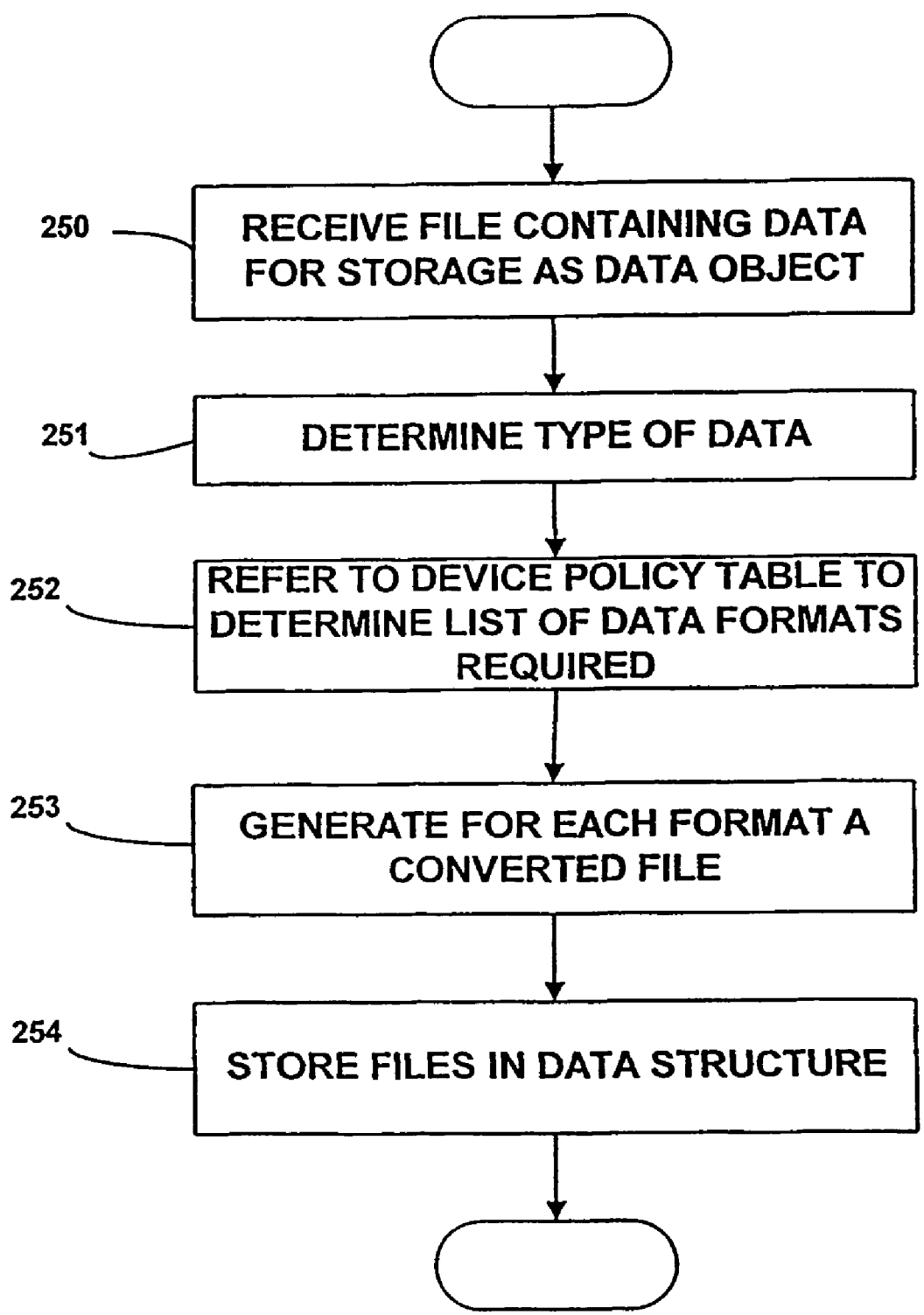
FIG. 25 is a flowchart illustrating a method of file storage.

FIG. 25 illustrates the steps in the method of operating the elements of FIG. 24. At step 250, the data converter 241 receives from the authoring suite 240 a file containing data which is to be stored as a data object. As an example, this data file comprises an image in GIF format.

At step 251, the data converter 241 determines the type of data (i.e. whether image, text or other data type) and refers to the device policy table 30 to determine a list of different data formats which may be required during operation of the code generating engine 21, according to the value of the device type identifier 45.

At step 253, the data converter 241 generates for each of these formats in the list a converted file having the appropriate format and associated metadata. At step 243, the file manager 242 stores the files in the data structure.

This arrangement enables the author to enter text and graphic parameters only once, the data converter and file manager then undertaking the task of generating sets of files in different formats for storage and subsequent use as data objects.

The above described embodiments have referred to implementation using JAVA, by way of example. Alternatives to JAVA may be used in implementing the present invention and the references to JAVA, JAVA beans and JAVA virtual machine are not to be read as limiting the scope of the invention.

The present invention can be implemented by a computer program operated on a computer in the context of a web server. An aspect of the present invention thus provides a storage medium storing processor implementable instructions for controlling a processor to carry out the method as hereinbefore described.

Further the computer program can be obtained in electronic form for example by downloading the code over a network such as the internet. In accordance with another aspect of the present invention there is provided an electrical signal carrying processor implementable instructions for controlling a processor to carry out the method as hereinbefore described.

The present invention has applications to networks other than the internet including private networks and further public networks.

The policy tables, custom tags and the code generating engine may be supplied as software products either separately or in combination as a software kit and constitute further aspect of the present invention, whether embodied in storage medium or electrical signal form.

The device names referred to in FIG. 6 include in layers 63, 64 and 65 the names of device types which are hereby acknowledged as being Trade Marks.

APPENDIX 1

Canvas Authored for the Volantis Product

```
<%@ include file="Volantis.jsp" %>
<vt:canvas layoutName="eportal" themeName = "theme1>
<vt:anchor href="TestPortal.jsp" pane="logo1" image="stars"/>
<vt:logo pane="logo2" src="volantis" alt="volantis"/>
<vt:welcome pane="welcome"/>
<vt:h2 pane="shop">Shop for Cool Stuff at <a href="shopcart.jsp.">
Shop Volantis</a></vt:h2>
  <vt:Headline pane="headlines" show="2" />
  <vt:Content pane="cpynews"/>
</vt:canvas>
```

APPENDIX 2

Resulting Page Sent to a Personel Computer Using HTML

```
<html>
 <head>
 <link REL=STYLESHEET HREF="css/JSP-Styles.css"
 TYPE="text/css">
 <script language="JavaScript">
 <!--
 //--></script>
 </head>
 <body>
 <table border=0 cellpadding=0 columns=2><tr>
 <td align=center valign=top>
 <table border=0 cellpadding=0 columns=1>
 <tr><td align=center valign=top>
 <table border=0 cellpadding=0 columns=1>
 <tr><td align=center valign=top>
 <table border=0 cellpadding=0 columns=2><tr>
 <td align=center valign=top>
 <table border=0 cellpadding=0><tr>
 <td>
 <a href="TestPortal.jsp" >
 <img src="images/stars0.jpg"/>
 </a>
 </td></tr></table>
 </td>
 <td align=center valign=top>
 <table border=0 cellpadding=0><tr>
 <td>
 <img src="images/volantis0.jpg" alt="volantis">
 </td></tr></table>
 </td>
 </tr></table>
 </td></tr>
 <tr><td align=center valign=top>
 <table border=0 cellpadding=0><tr>
 <td>
 <hr><b>Welcome to Volantis; Rhys
Lewis</b>
    You can set up your news preferences
    <a href=e__setupnewsdevice.adp>here</a>
    <br><hr>
 </td></tr></table>
 </td></tr>
 <tr><td align=center valign=top>
 <table border=0 cellpadding=0><tr>
 <td>
 <h2>Shop for Cool Stuff at <a href="shopcart.jsp">Shop Volantis</a></h2>
 </td></tr></table>
 </td></tr>
 </table>
 </td></tr>
 <tr><td align=center valign=top>
 <table border=0 cellpadding=0 columns=2><tr>
 <td align=center valign=top>
 <table border=0 cellpadding=0><tr>
 <td>
 <table align=right border=0>
     <tr><td><table borderwidth=1 bordercolor=cyan><tr><th class=headline
align=left>XML and metadata news</th></tr>
     <tr><td><a
href=clickthru.jsp?cat=278&url=http://c.moreover.com/click/here.pl?x8102028>Thin
kersGroup.com Completes Beta Test of Web-To-Wireless Application</a></td></tr>
     <tr><td class=sub>07 Jul 2000 08:05AM</td></tr>
     <tr><td><a
 href=clickthru.jsp?cat=278&url=http://c.moreover.com/click/here.pl?x8099873>XSL
gives your XML some style</a></td></tr>
     <tr><td class=sub>07 Jul 2000 06:59AM</td></tr>
     </table></td></tr>
         <tr><td><table borderwidth=1 bordercolor=cyan><tr><th class=headline
align=left>Wireless sector news</th></tr>
     <tr><td><a
 href=clickthru.jsp?cat=277&url=http://c.moreover.com/click/here.pl?x8102312>Nokia,
C&W team up to offer mobile internet services</a></td></tr>
     <tr><td class=sub>07 Jul 2000 08:16AM</td></tr>
     <tr><td><a
 href=clickthru.jsp?cat=277&url=http://c.moreover.com/click/here.pl?x8102269>NASDAQ
Outlook; Qualcomm To Finish Physics Lesson Soon, Then Could Double</a></td></tr>
     <tr><td class=sub>07 Jul 2000 08:15AM</td></tr>
```

APPENDIX 2-continued

Resulting Page Sent to a Personel Computer Using HTML

```
    </table></td></tr>
<tr><td><table borderwidth=1 bordercolor=cyan><tr><th class=headline align=left>Top
technology stories</th></tr>
    <tr><td><a
 href=clickthru.jsp?cat=273&url=http://c.moreover.com/click/here.pl?x8102034>PRIMUS
Telecommunications and Inktomi Forge Strategic Alliance To Build Global
Infrastructure for Streaming Media</a></td></tr>
    <tr><td class=sub>07 Jul 2000 08:05AM</td></tr>
    <tr><td><a
href=clickthru.jsp?cat=273&url=http://c.moreover.com/click/here.pl?x8098274>Jesse
Berst's Anchordesk: The Long Wait for Web Phones</a></td></tr>
    <tr><td class=sub>07 Jul 2000 06:19AM</td></tr>
    </table
    </td></tr></table>
    </td>
    <td align=center valign=top>
    <table border=0 cellpadding=0><tr>
    <td>
    <table width=100% align=top>
    <tr><td colspan=2><h2>Informix Upgrades Java Database</h2></td></tr>
    <tr><td width=30% valign=top align=left><img src=database.gif border=0></td>
        <td width=70%><p><b>Informix</b> (NASDAQ: IFMX) says it has upgraded its
Cloudscape Java-based database to support Windows CE and Pocket PC. In addition to
adding platforms, Cloudscape 3.5 has added greater security.</p>
        <p>Cloudscape 3.5 consists of the Cloudscape database management system,
Cloudsync for data and application synchronization and Cloudconnector, a server
framework for Internet connections to the Cloudscape DBMS.</p>
        <p>The company is demonstrating the update at the JavaOne conference this week
in San Francisco. It will be commercially available in July 2000. Server pricing
starts at $1,999.</p> </td></tr>
    <tr><td colspan=2><h2>AT&T Wireless, Nortel to Trial GPRS</h2></td></tr>
    <tr><td width=30% valign=top align=left><img src=wireless.gif border=0></td>
        <td width=70%><p>AT&T Wireless Services (NYSE: AWE) and Nortel Networks
(NYSE/TSE: NT) say they will start testing broader-band General Packet Radio
Service (GPRS) in the U.S. this summer and are working toward the eventual delivery
of faster third-generation (3G) service.</p>
        <p>The GPRS tests will begin in several unnamed major U.S. cities this summer,
the companies said in an announcement. The companies are working together to
eventually introduce full 3G TDMA- EDGE technology.</p>
        <p>"These trials using GPRS core network solutions from Nortel Networks are a
significant step in the development of TDMA-EDGE and underscore the rapid progress
industry is making", said Roderick Nelson, chief technology officer, AT&T Wireless
Services. The eventual goal is to offer broadband wireless coverage to the
company's customers anywhere in the world, he added.</p>
        <p>The companies didn't provide specifics about when the GPRS service will be
commercially available.</p>
    </td></tr>
    </table>
    </td></tr></table>
    </td>
    </tr></table>
    </td></tr>
    <tr><td align=center valign=top>
    <table border=0 cellpadding=0><tr>
    <td>
    </td></tr></table>
    </td></tr>
    </table
    </td>
    <td align=Left valign=Center>
    <table border=0 cellpadding=0><tr>
    <td>
    </td></tr></table>
    </td>
    </tr></table>
    </body></html>
```

APPENDIX 3

Resulting Page Sent to an Internet-Enabled Mobile Phone

```
    <?xml version="1.0"?><!DOCTYPE wml PUBLIC "-//WAPFORUM//DTD WML 1.1//EN"
"http://www.wapforum.org/DTD/wml_1.1.xml">
    <wml><card>
```

APPENDIX 3-continued

Resulting Page Sent to an Internet-Enabled Mobile Phone

```
<table align="center" columns="2"><tr>
<td>
<p>
<a href="TestPortal.jsp">
<img src="images/stars10.bmp"/>
</a>
</p>
</td>
<td>
<b>volantis</b>
</td>
</tr></table>
<p><em><a href="list1tmp1475618599.wml">Company News</a></em></p>
<p><em><a href="list1tmp1484083075.wml">Headline News</a></em></p>
<p><a href="LoginForm.jsp">Please log in</a></p>
</card></wml>
```

APPENDIX 4

The Deck Generated Automatically to Hold the Company News

```
<?xml version="1.0"?><!DOCTYPE wml PUBLIC "-//WAPFORUM//DTD WML 1.1//EN" "httpd://www.wapforum.org/DTD/wml_1.1.xml">
<wml><card>
    <p><em><a href="list2tmp302605028.wml">Informix Upgrades Java
    Database</a></em></p>
<p><em><a href="list2tmp299142288.wml">AT&T Wireless, Nortel to Trial GPRS</a></em></p>
    </card></wml>
```

APPENDIX 5

The Deck Generated Automatically to Hold the Story About AT&T

```
<?xml version="1.0"?><!DOCTYPE wml PUBLIC "-//WAPFORUM//DTD WML 1.1//EN" "httpd://www.wapforum.org/DTD/wml_1.1.xml">
    <wml><card>
    <p><em>AT&T Wireless, Nortel to Trial GPRS</em></p><p>AT&T Wireless Services (NYSE: AWE) and Nortel Networks (NYSE/TSE: NT) say they will start testing broader-band General Packet Radio Service (GPRS) in the U.S. this summer and are working toward the eventual delivery of faster third-generation (3G) service.</p>
    <p>The GPRS tests will begin in several unnamed major U.S. cities this summer, the companies said in an announcement. The companies are working together to eventually introduce full 3G TDMA- EDGE technology.</p>
    <p>"These trails using GPRS core network solutions from Nortel Networks are a significant step in the development of TDMA-EDGE and underscore the rapid progress industry is making", said Roderick Nelson, chief technology officer, AT&T Wireless Services. The eventual goal is to offer broadband wireless coverage to the company's customers anywhere in the world, he added.</p>
    <p>The companies didn't provide specifics about when the GPRS service will be commercially available.</p>
    </card></wml>
```

The invention claimed is:

1. Apparatus for responding to a request message sent from a remote user device for web page information by generating web page code capable of being interpreted by a browser within the remote user device for displaying one or more web pages and for outputting a response message comprising the web page code, the apparatus comprising:

extracting means for extracting from the request message information determining a device type identifier identifying the remote user device which sent the request message as being one of a set of possible remote user device types having different capabilities of processing and displaying web page code;

a processor for operating a code generating engine to generate the web page code;

first memory means for storing the web page information as a content document comprising a set of instructions authored in a script language for generating the web page code; and second memory means for storing device dependent information for each of the set of possible remote user device types;

wherein the code generating engine comprises interpreting means for interpreting the instructions authored in the script language with reference to selected device dependent information corresponding to the device type identifier of the remote user device which sent the request message, the code generating engine thereby being operable to generate the web page code in a form in which the web page code is tailored to the capabilities of the remote user device for processing and displaying web page code;

wherein the content document comprises at least one component name identifying a respective data component, and wherein the apparatus comprises a data structure in which at least one data component exists as a set of data objects defining multiple versions of the data component where the data objects have different data properties suited to the different capabilities of processing and displaying web page code of the different remote user devices; and means for selecting a data object from the set of data objects identified by a component name for inclusion in the web page code on the basis of the device type identifier of the remote user device which sent the request message;

wherein the selecting means is operable to look up a predetermined selection of data object using a component policy table in a case where selection of the version of data component for the remote user device is predetermined by an author of the content document, and wherein the selecting means is further operable to determine technical attributes of the remote user device and to select the data object by comparing the technical attributes with data properties of each data object in a case where no version of the data component for the remote user device has been predetermined by the author of the content document, wherein the technical attributes of the remote user device are defined in a device policy table.

2. Apparatus as claimed in claim 1, wherein the script language comprises a first mark up language.

3. Apparatus as claimed in claim 2, wherein the content document comprises content code defining information to be displayed and predefined tags for controlling the presentation of the information to be displayed; wherein the interpreting means is operable to interpret each tag with reference to the selected device dependent information.

4. Apparatus as claimed in claim 3, wherein the device dependent information is stored as a set of tables and wherein the device dependent information is assimilated in a set of objects accessible to the tags in a run time environment of the code generating engine.

5. Apparatus as claimed in claim 4, wherein the run time environment comprises a virtual machine and the set of objects comprise individual code segments.

6. Apparatus as claimed in claim 4, wherein the set of tables are in hierarchical form defining a hierarchical tree in which device type nodes correspond to respective device types in successive hierarchical layers.

7. Apparatus as claimed in claim 6, wherein each device type node is represented by respective entries in each of the tables to define those attributes of the device type which differ from attributes of a parent node from which the device type node branches.

8. Apparatus as claimed claim 4, wherein the set of tables comprises a protocol policy table defining the format of the web page code generated by the code generating engine.

9. Apparatus as claimed in claim 4, wherein the set of tables comprises a style policy table defining the style of presentation of the web page information.

10. Apparatus as claimed in claim 9, wherein the style policy table defines attributes including at least one of:
(a) font attributes;
(b) colour; and
(c) background.

11. Apparatus as claimed in claim 4, wherein the set of tables comprises a themes policy table defining at least one of
(a) decorative features; and
(b) a logo.

12. Apparatus as claimed in claims 4, wherein the set of tables comprises a layout policy table defining for each device type the layout of the web page information with respect to a display area of each device type.

13. Apparatus as claimed in claim 12, wherein the layout policy table defines the layout policy with reference to a set of panes comprising portions of the display area and containing respective portions of the web page information.

14. Apparatus as claimed in claim 13, wherein the layout policy determines for each device type the number and configuration of panes.

15. Apparatus as claimed in claim 14 wherein, for a device type having minimal screen area, the layout policy determines the configuration of pages to be a set of decks comprising single panes for use in displaying the web page information by displaying the decks successively.

16. Apparatus as claimed in claim 13, comprising a graphical user interface for receiving user input and document authoring means responsive to the graphical user interface for creating documents of the web page generating instructions.

17. Apparatus as claimed in claim 16, wherein the authoring means comprises means for receiving data, and data conversion means for converting the data into a set of data objects each containing a respective version of the data suited to technical attributes of a respective device type.

18. Apparatus as claimed in claim 17, wherein the set of data objects further comprises multiple versions corresponding to a set of available user preferences.

19. Apparatus as claimed in claim 18, comprising means for determining a user preference from the request message and wherein the selecting means is further operable to select the data object according to the user preference.

20. Apparatus as claimed in claim 19, wherein the multiple versions comprise versions in each of a set of languages and wherein the user preference comprises a preferred language.

21. A method as claimed in claim 17, wherein the set of data objects further comprises multiple versions corresponding to a set of available user preferences; and further comprising: determining a user preference from the request message whereby the selecting step selects the data object according to the user preference.

22. A method as claimed in claim 21, wherein the multiple versions comprise versions in each of a set of languages and wherein the user preference comprises a preferred language.

23. Apparatus as claimed in claim 4, wherein the set of tables comprises a dynamic policy table defining code generating attributes which are determined according to the values of time varying parameters.

24. Apparatus as claimed in claim 23, wherein the code generating attributes define image content of the web page code and the time varying parameter is the bandwidth available for communication with the device.

25. Apparatus as claimed in claim 1 wherein the web page code is generated in a second mark up language.

26. Apparatus as claimed in claim 10, comprising means for selecting the second mark up language in accordance with the selected device dependent information in the protocol policy table from a number of mark up languages comprising at least HTML and WML.

27. Apparatus as claimed in claim 1, wherein the data objects are stored in a data structure in which metadata is stored in association with each data object and wherein the data properties of each data object are defined by respective metadata.

28. Apparatus as claimed in claim 1, comprising a buffer memory for storing the portions of code for subsequent transmission to the user device.

29. Apparatus as claimed in claim 28, comprising a session memory for storing client data received in successive messages from the user device in response to successive transmissions of the respective portions of code representing portions of the pane, and means for combining as a single data object client data for a completed session in which client data is received responsive to all of the portions of the pane.

30. Apparatus as claimed in claim 29, wherein the pane defines a form and wherein the portions of the pane comprise respective data fields of the form.

31. Apparatus as claimed in claim 1, comprising a cache memory operable to store a copy of web page code output in a response message; and means for outputting web page code from the stored copy in response to receiving a further request message for the same web page information.

32. Apparatus as claimed in claim 31, wherein the cache memory is operable to selectively store web page code depending upon whether a requirement for cache memory storage is defined in the content document from which the web page code is generated.

33. Apparatus as claimed in claim 32, wherein the requirement for cache memory storage is set by insertion in the content document a tag defined by the script language in which the content document is authored.

34. Apparatus as claimed in claim 33, wherein the tag further defines a duration of validity of the copy of web page code stored in cache memory.

35. Apparatus as claimed in claim 1, wherein the extracting means is operable to extract identification information from a header of the request message and to determine the device type identifier by referring to a table of device type identifiers for which device dependent information is stored in the second memory means.

36. Apparatus as claimed in claim 35, wherein the extracting means is operable to determine from the device type identifiers table, for the identification information obtained from the header, whether a corresponding device type identifier is available and, if not, to generate an indication that the remote user device from which the request message was sent is not recognized as being one of the set of different remote user devices for which device dependent information is stored.

37. Apparatus as claimed in claim 36, comprising probe means responsive to the indication that the remote user device is an unrecognised remote user device to send a probe agent to the unrecognised remote user device for extracting device information relating to the capabilities of the unrecognised remote user device for processing and displaying web page code, and means for receiving a response message containing the device information from the unrecognised remote user device.

38. Apparatus as claimed in claim 37, comprising means for comparing the received device information with the device dependent information for the set of possible remote user device types in said second memory and means for determining a device type identifier to be used in relation to the unrecognised remote user device corresponding to a best match between the device dependent information for the set of remote user devices and the received device information for the unrecognised remote user device.

39. Apparatus as claimed in claim 38, wherein the code generating engine is operable to generate web page code using the device type identifier determined to be a best match to the unrecognised remote user device.

40. Apparatus as claimed in claim 1, further comprising: receiving means for receiving the request message via a network to which the apparatus is connected in use; and output means for outputting the response message comprising the web page code to the user device via the network to which the apparatus is connected in use.

41. Apparatus as claimed in claim 1, comprising means for selecting the web page information from the first memory means according to the content of the request message and means for inputting the web page information and the device type identifier to the code generating engine.

42. A code generating engine stored in a computer readable medium for use in an apparatus of claim 1.

43. Apparatus as claimed in claim 1, comprising:
code measuring means for measuring the amount of code representative of a page generated by the code generating engine;
determining means for determining whether the remote user device includes sufficient data capacity to accommodate the measured amount of code, and means responsive to a negative determination for dividing the code into two or more portions of code such that each portion is representative of a respective portion of the page and comprises an amount of code within the data capacity of the user device.

44. Apparatus as claimed in claim 43 wherein the determining means is operable to determine whether the remote user device has sufficient data capacity by referring to the device policy table.

45. A method of responding to a request message sent from a remote user device for web page information by generating web page code capable of being interpreted by a browser within the remote user device for displaying one or more web pages and for outputting a response message comprising the web page code, the method comprising:
extracting from the request message information determining a device type identifier identifying the remote user device which sent the request message as being one of a set of possible remote user device types having different capabilities of processing and displaying web page code;
operating a code generating engine to generate the web page code; storing the web page information in a first memory means as a content document comprising a set of instructions authored in a script language for generating the web page code; and
storing device dependent information for each of the set of different remote user device types in a second memory means;
wherein the code generating engine interprets the instructions with reference to selected device dependent information corresponding to the device type identifier of the remote user device which sent the request message, the code generating engine thereby generating the web page code in a form in which the web page code is tailored to the capabilities of the remote user device for processing and displaying web page code;
wherein the content document comprises at least one component name identifying a respective data component, and wherein the method comprises accessing a data structure in which at least one data component exists as a set of data objects defining multiple versions of the data component where the data objects have different data properties suited to the different capabilities of processing and displaying web page code of the different remote user devices, and further comprising selecting a data object from the set of data objects identified by a component name for inclusion in the web page code on the basis of the device type identifier;

wherein the selecting step comprises looking up a predetermined selection of data object using a component policy table in a case where selection of the version of data component for the remote user device is predetermined by an author of the content document, and wherein the selecting step further comprises determining technical attributes of the remote user device and selecting the data object by comparing the technical attributes with data properties of each data object in a case where no version of the data component for the remote user device has been predetermined by the author of the content document, wherein the technical attributes of the remote user device are defined in a device policy table.

46. A method as claimed in claim 45, wherein the script language comprises a first mark up language.

47. A method as claimed in claim 46, wherein the content document comprises content code defining information to be displayed and predefined tags for controlling the presentation of the information to be displayed; wherein the interpreting means interprets each tag with reference to the selected device dependent information.

48. A method as claimed in claim 47, wherein the device dependent information is stored as a set of tables and wherein the device dependent information is assimilated in a set of objects accessible to the tags in a run time environment of the code generating engine.

49. A method as claimed in claim 48, wherein the run time environment comprises a virtual machine and the set of objects comprise independent code segments.

50. A method as claimed claim 48, wherein the set of tables are in hierarchical form defining a hierarchical tree in which device type nodes correspond to respective device types in successive hierarchical layers.

51. A method as claimed in claim 50, wherein each device type node is represented by respective entries in each of the tables to define those attributes of the device type which differ from attributes of a parent node from which the device type node branches.

52. A method as claimed in claim 48, wherein the set of tables comprises a protocol policy table defining the format of the web page code generated by the code generating engine.

53. A method as claimed in claim 48, wherein the set of tables comprises a style policy table defining the style of presentation of the web page information.

54. A method as claimed in claim 53, wherein the style policy table defines attributes including at least one of:
(a) font attributes;
(b) colour; and
(c) background.

55. A method as claimed in any of claims 48 to 51, 52-54, wherein the set of tables comprises a themes policy table defining at least one of
(a) decorative features; and
(b) a logo.

56. A method as claimed in claim 48, wherein the set of tables comprises a layout policy table defining for each device type the layout of the web page information with respect to a display area of each device type.

57. A method as claimed in claim 56, wherein the layout policy table defines the layout policy with reference to a set of panes comprising portions of the display area and containing respective portions of the web page information.

58. A method as claimed in claim 57, wherein the layout policy determines for each device type the number and configuration of panes.

59. A method as claimed in claim 58 wherein, for a device type having minimal screen area, the layout policy determines the configuration of pages to be a set of decks comprising single panes for use in displaying the web page information by displaying the decks successively.

60. A method as claimed in claim 57, comprising receiving user input via a graphical user interface and operating a document authoring means responsive to the graphical user interface for creating documents of the web page generating instructions.

61. A method as claimed in claim 60, comprising the steps of receiving data, and converting the data into a set of data objects each containing a respective version of the data suited to technical attributes of a respective device type.

62. A method as claimed in claim 61, wherein the set of data objects further comprises multiple versions corresponding to a set of available user preferences.

63. A method as claimed in claim 62, comprising means for determining a user preference from the request message and wherein the selecting means is further operable to select the data object according to the user preference.

64. A method as claimed in claim 63, wherein the multiple versions comprise versions in each of a set of languages and wherein the user preference comprises a preferred language.

65. A method as claimed in claim 48, wherein the set of tables comprises a dynamic policy table defining code generating attributes which are determined according to the values of time varying parameters.

66. A method as claimed in claim 65, wherein the code generating attributes define image content of the web page code and the time varying parameter is the bandwidth available for communication with the device.

67. A method as claimed in claim 45 wherein the web page code is generated in a second mark up language.

68. A method as claimed in claim 67, comprising means for selecting the second mark up language in accordance with the selected device dependent information in the protocol policy table from a number of mark up languages comprising at least HTML and WML.

69. A method as claimed in claim 45, wherein the data objects are stored in a data structure in which metadata is stored in association with each data object and wherein the data properties of each data object are defined by respective metadata.

70. A method as claimed in claim 45, comprising storing the portions of code in a buffer memory for subsequent transmission to the user device.

71. A method as claimed in claim 70, comprising storing in a session memory client data received in successive messages from the user device in response to successive transmissions of the respective portions of code representing portions of the page, and combining as a single data object client data for a completed session in which client data is received responsive to all of the portions of the page.

72. A method as claimed in claim 71, wherein the page defines a form and wherein the portions of the page comprise respective data fields of the form.

73. A method as claimed in claim 45, comprising storing in a cache memory a copy of web page code output in a response message; and outputting web page code from the stored copy in response to receiving a further request message for the same web page information.

74. A method as claimed in claim 73, wherein the cache memory selectively stores web page code depending upon whether a requirement for cache memory storage is defined in the content document from which the web page code is generated.

75. A method as claimed in claim 74, wherein the requirement for cache memory storage is set by operation of a tag inserted in the content document.

76. A method as claimed in claim 75, wherein the tag further defines a duration of validity of the copy of web page code stored in cache memory.

77. A method as claimed in claim 45, wherein the extracting step extracts identification information from a header of the request message and determines the device type identifier by referring to a table of device type identifiers for which device dependent information is stored in the second memory means.

78. A method as claimed in claim 77, wherein the extracting step determines from the device type identifiers table, for the identification information obtained from the header, a corresponding device type identifier is available and, if not, generates an indication that the user device is unrecognised.

79. A method as claimed in claim 78, comprising actuating a probe means in response to the indication that the user device is unrecognised to send a probe agent to the user device for extracting device information, and receiving a response message containing the device information from the user device.

80. A method as claimed in claim 79, comprising comparing the received device information with stored device dependent information for known devices and determining a device type identifier corresponding to a best match between the device dependent information for known devices and the device information for the unrecognised device.

81. A method as claimed in claim 80, wherein the code generating engine generates web page code using the device type identifier of the known device determined to be a best match to the unrecognised device.

82. A method as claimed claim 45, further comprising: receiving the request message via a network; and outputting the response message comprising the web page code to the user device via the network.

83. A method as claimed in claim 45, comprising selecting the web page information from the first memory means according to the content of the request message and inputting the web page information and the device type identifier to the code generating engine.

84. A computer program stored on a storage medium comprising processor implementable instructions for controlling a processor for carrying out the method of claim 45.

85. A storage medium storing processor implementable instructions for controlling a processor to carry out the method of claim 45.

86. A storage medium storing a set of policy tables for use in a method as claimed in claim 45.

87. A storage medium storing a set of tags for use in a method as claimed in claim 45.

88. A method as claimed in claim 45, comprising the steps of:
    measuring the amount of code representative of a page generated by the code generating engine;
    determining whether the remote user device includes sufficient data capacity to accommodate the measured amount of code, and, in response to a negative determination, dividing the code into two or more portions of code such that each portion is representative of a respective portion of the page and comprises an amount of code within the data capacity of the user device.

89. A method of responding to a request message from a remote user device for web page information by generating web page code capable of being interpreted by the remote user device for displaying one or more web pages and for outputting a response message comprising the web page code, the method comprising:
    storing the web page information in a first memory means as a content document authored in a script language comprising a set of instructions for generating the web page code; and
    storing device dependent information for each of the set of different remote user device types in a second memory means;
    determining a device type identifier identifying the remote user device which sent the request message as being one of a set of possible device types having different capabilities for processing and displaying web page code;
    operating a code generating engine to generate the web page code;
    wherein the content code comprises at least one component name identifying a respective data component for inclusion in the web page code, and wherein generating the web page code comprises accessing a data structure in which the data component exists as a set of data objects defining multiple versions of the data component where the data objects have different data properties suited to different remote user devices; and
    selecting a data object from the set of data objects identified by a component name for inclusion in the web page code on the basis of the device type identifier of the remote user device which sent the request message;
    wherein the selecting step comprises looking up a predetermined selection of data object using a component policy table in a case where selection of the version of data component for the remote user device is predetermined by an author of the content document, and wherein the selecting step further comprises determining technical attributes of the remote user device and selecting the data object by comparing the technical attributes with data properties of each data object in a case where no version of the data component for the remote user device has been predetermined by the author of the content document, wherein the selection step determines the technical attributes by referring to a device policy table.

90. A method as claimed in claim 89, wherein the data objects are stored in a hierarchical data structure in which metadata is stored in association with each data object and wherein the data properties of each data object are defined by respective metadata.

91. Apparatus for responding to a request message sent from a remote user device for web page information by generating web page code capable of being interpreted by the remote user device for displaying one or more web pages and for outputting to the remote user device a response message comprising the web page code, the apparatus comprising:
    extracting means for extracting an ID string from a header of the request message and referring to a device policy table of device type identifiers to determine whether the extracted ID string is recognized as corresponding to one of a set of device type identifiers for which corresponding device dependent information is available;
    a processor for operating a code generating engine to generate the web page code;

the code generating engine being operable in response to the extracted ID string being recognized to use the corresponding device type identifier to generate the web page code using device dependent information to generate the web page code in a form in which the web page code is tailored to capabilities of the remote user device to process and display web page code;

the apparatus further comprising probe means responsive to the extracted ID string not being recognised as corresponding to one of the set of device type identifiers for which corresponding device dependent information is available to send a probe agent to the remote user device for extracting further device information on the capabilities of the remote user device for processing and displaying web page code, and means for receiving a response message containing the further device information from the remote user device for use in generating the web page code in a form which is suited to the capabilities of the remote user device for processing and displaying the web page code.

92. Apparatus as claimed in claim 91, comprising means for comparing the received further device information with stored device dependent information corresponding to each of the device type identifiers in the device policy table and means for selecting one of said device type identifiers on the basis of a best match between the further device dependent information and the further device information.

93. Apparatus as claimed in claim 92, wherein the code generating engine is operable to generate web page code using the device type identifier selected on the basis of the best match.

94. A method of responding to a request message sent from a remote user device for web page information by generating web page code capable of being interpreted by the remote user device for displaying one or more web pages and for outputting to the remote user device a response message comprising the web page code, the method comprising:

extracting an ID string from a header of the request message and referring to a device policy table of device type identifiers to determine whether the extracted ID string is recognized as corresponding to one of a set of device type identifiers for which corresponding device dependent information is available;

operating a code generating engine to generate the web page code; the code generating engine being operated in response to the extracted ID string being recognized to use the corresponding device type identifier to generate the web page code using device dependent information to generate the web page code in a form in which the web page code is tailored to capabilities of the remote user device to process and display web page code; the method further comprising actuating a probe means responsive to the extracted ID string not being recognised as corresponding to one of the set of device type identifiers for which corresponding device dependent information is available to send a probe agent to the remote user device for extracting further device information on the capabilities of the remote user device for processing and displaying web page code, and receiving a response message containing the further device information from the remote user device for use in generating the web page code in a form which is suited to the capabilities of the remote user device for processing and displaying the web page code.

95. A method as claimed in claim 94, comprising comparing the received further device information with stored device dependent information corresponding to each of the device type identifiers in the device policy table and selecting one of said device type identifiers on the basis of a best match between the further device dependent information and the stored device information.

96. A method as claimed in claim 95, wherein the code generating engine generates the web page code using the device type identifier selected on the basis of the best match.

* * * * *